(12) United States Patent
Xiong et al.

(10) Patent No.: US 12,148,245 B2
(45) Date of Patent: Nov. 19, 2024

(54) RANKING IMAGES IN AN IMAGE GROUP

(71) Applicant: Western Digital Technologies, Inc., San Jose, CA (US)

(72) Inventors: Shaomin Xiong, Newark, CA (US); Toshiki Hirano, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 386 days.

(21) Appl. No.: 17/557,545

(22) Filed: Dec. 21, 2021

(65) Prior Publication Data
US 2023/0196832 A1    Jun. 22, 2023

(51) Int. Cl.
*G06V 40/16* (2022.01)
*G06V 10/774* (2022.01)
*G06V 10/776* (2022.01)

(52) U.S. Cl.
CPC .......... *G06V 40/172* (2022.01); *G06V 10/774* (2022.01); *G06V 10/776* (2022.01); *G06V 40/169* (2022.01)

(58) Field of Classification Search
CPC .. G06V 40/172; G06V 10/774; G06V 10/776; G06V 40/169; G06V 10/7635; G06V 40/161; G06V 20/30
See application file for complete search history.

(56) References Cited

U.S. PATENT DOCUMENTS

| 7,551,755 | B1 | 6/2009 | Steinberg et al. |
| 7,564,994 | B1 | 7/2009 | Steinberg et al. |
| 7,912,246 | B1 * | 3/2011 | Moon ..................... G06F 18/24 382/118 |
| 9,268,793 | B2 * | 2/2016 | Hu ....................... G06F 18/2433 |

(Continued)

FOREIGN PATENT DOCUMENTS

| KR | 10-2019-0021130 | 3/2019 |
| KR | 20190021130 A | 3/2019 |

(Continued)

OTHER PUBLICATIONS

Alvarez-Rodríguez, Jose María, and Ricardo Colomo-Palacios. "Assessing professional skills in a multi-scale environment by means of graph-based algorithms." 2014 European network intelligence conference. IEEE, 2014. (Year: 2014).*

(Continued)

*Primary Examiner* — Edward F Urban
*Assistant Examiner* — Jongbong Nah
(74) *Attorney, Agent, or Firm* — Patent Law Works LLP

(57) ABSTRACT

Systems, methods, and data storage devices for image grouping in an end user device using trained machine learning group classifiers are described. The end user device may include an image group classifier configured to classify new image data objects using an image classification algorithm and set of machine learning parameters previously trained for a specific image group. The end user device may determine embeddings that quantify features of the target image object and use those embeddings and the image group classifier to selectively associate group identifiers with each new image data object received or generated by the end user device. Calibration, including selection and training, of the image group classifiers and ranking of classified images are also described.

20 Claims, 9 Drawing Sheets

(56) References Cited

U.S. PATENT DOCUMENTS

| | | | |
|---|---|---|---|
| 9,330,111 B2* | 5/2016 | Datta | G06F 16/58 |
| 9,430,697 B1* | 8/2016 | Iliadis | G06V 40/172 |
| 10,055,486 B1* | 8/2018 | Xu | G06F 16/5866 |
| 10,120,879 B2* | 11/2018 | An | G06F 16/583 |
| 10,810,409 B2 | 10/2020 | Bacivarov et al. | |
| 2009/0234878 A1 | 9/2009 | Herz et al. | |
| 2010/0172550 A1* | 7/2010 | Gilley | G11B 27/034 |
| | | | 382/218 |
| 2013/0148898 A1 | 6/2013 | Mitura et al. | |
| 2017/0046385 A1 | 2/2017 | Raina et al. | |
| 2017/0046622 A1* | 2/2017 | Gaither | G06F 40/247 |
| 2019/0205620 A1 | 7/2019 | Yi et al. | |
| 2019/0236371 A1 | 8/2019 | Boonmee et al. | |
| 2020/0380320 A1* | 12/2020 | Berg | G06V 30/274 |
| 2021/0125001 A1 | 4/2021 | Guo et al. | |
| 2021/0133229 A1 | 5/2021 | Astrakhantsev et al. | |

FOREIGN PATENT DOCUMENTS

| | | |
|---|---|---|
| KR | 10-2021-0050166 | 5/2021 |
| KR | 20210050166 A | 5/2021 |

OTHER PUBLICATIONS

International Search Report and Written Opinion for International Application No. PCT/US2022/030481, mailed Oct. 17, 2022, 10 pgs.

International Search Report and Written Opinion for International Application No. PCT/US2022/030482, mailed Oct. 21, 2022, 9 pgs.

* cited by examiner

RANKING IMAGES IN AN IMAGE GROUP

TECHNICAL FIELD

The present disclosure generally relates to image classification and management for end user devices and, more particularly, to locating trained image classifiers in end user devices.

BACKGROUND

Data storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of an end user, edge, or host device. These storage devices may include integrated storage devices built into the enclosure of the end user device, removable storage devices mating with the host device through a physical interface connector (directly or through an interface cable), and network storage devices communicating with the end user device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting an end user device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

End user devices, such as smartphones, tablets, digital cameras, personal computers, and similar devices, are increasingly used to capture and store image data, such as digital photographs, in increasingly large volumes. The end user devices may include one or more image management applications configured to index the photos stored in the data storage device (or devices) associated with the end user device. These image management applications may allow the user to organize, tag, edit, navigate, and display photos in various ways. Image management applications and/or image files themselves may include a variety of image metadata describing each image, such as time and location data, image format specifications, edit/correction data, and/ or image tags assigned by the user or one or more other applications.

There is a desire to automate the identification and grouping of subject matter within a given pool of images, such as the collection of photos stored in an end user device or its associated storage devices. Increasingly, machine learning may be applied to process a volume of photos, identify objects (such as human faces), and determine similarity factors among those objects for grouping. These groupings may then be tagged automatically or with the assistance of a user to identify the object. Due to the processing requirements to train and execute machine learning algorithms for object detection and classification, these operations may commonly be executed in a server environment based on storing the collection of photos to a remote storage pool and associated server cluster, such as cloud-based photo storage or social media applications.

However, sending personal photos to cloud-based services may be less convenient, less secure, and less responsive than being able to process image data locally. Additionally, some users may have privacy concerns with sending personal photos for remote storage and processing. The large volumes of photo data some users accumulate and available network bandwidth for some users may also make cloud-based image classification less desirable. A reliable process for grouping, classifying, and navigating images in end user devices and/or their corresponding data storage devices may be needed.

SUMMARY

Various aspects for using a machine learning-based grouping classifier for classifying images at an end user device, particularly use of trained facial image classifiers for selected groups, are described.

One general aspect includes a system that includes: at least one processor, at least one memory; a storage medium configured to store user image data; an image manager, stored in the at least one memory for execution by the at least one processor, configured to index image data objects in the user image data; at least one image group classifier, stored in the at least one memory for execution by the at least one processor; and at least one ranking engine, stored in the at least one memory for execution by the at least one processor. The at least one image group classifier is configured to: determine a first set of embeddings quantifying a plurality of features in a set of image data objects; process the first set of embeddings for each image data object in the set of image data objects through a set of machine learning parameters assigned to a first group identifier; and determine a subset of image data objects in the set of image data objects corresponding to the first group identifier. The at least one ranking engine is configured to: process the subset of image data objects; and return a ranked list of the subset of image data objects, where the image manager is further configured to display, based on the ranked list, at least one image data object from the subset of image data objects on a graphical user interface.

Implementations may include one or more of the following features. The system may include a face detector, stored in the at least one memory for execution by the at least one processor, configured to: detect, in the set of image data objects, at least one human face; and calculate, for the at least one human face, the first set of embeddings quantifying the plurality of features of the at least one human face using a first embedding model. The at least one face may include a plurality of faces in the set of image data object; the embeddings may quantify the plurality of features for each face of the plurality of faces; and the first group identifier may correspond to a social group corresponding to a plurality of people. Each image data object in the subset of image data objects may include the at least one human face corresponding to the first group identifier and the at least one ranking engine may be further configured to: calculate, for the at least one human face in each image data object in the subset of image data objects, a second set of embeddings quantifying the plurality of features of the at least one human face using a second embedding model; and use the second set of embeddings to determine the ranked list of the subset of image data objects. The at least one image group classifier may be further configured to: determine, for each image data object in the set of image data objects, a confidence score based on the set of machine learning parameters and the first set of embeddings for that image data object; and compare, the confidence score to a group confidence threshold, to determine the subset of image data objects in the set of image data objects corresponding to the first group identifier, where the at least one ranking engine is further configured to use the confidence score for each image data object in the subset of image data objects corresponding to the first group identifier. The at least one ranking engine may be further configured to use a graph-based ranking algorithm to process the first set of embeddings to determine the ranked list of the subset of image data objects. The graph-based ranking algorithm may be selected from: a PageRank algorithm; a hyperlink-induced topic search algorithm; and a SimRank algorithm. The graph-based ranking algorithm may be configured to: tokenize each embedding of the first set of embeddings for each image data object in the subset of image data objects; and selectively relate, based on at least one weight value, the tokenized embeddings for a first image data object to corresponding tokenized embeddings for each other image data object in the subset of image data objects to determine the ranked list of the subset of image data objects. The at least one ranking engine may be further configured to: receive at least one user tag for at least one image data object in the subset of image data objects; and modify at least one weight value corresponding to the at least one image data object associated with the at least one user tag. The at least one ranking engine may be further configured to, for each image data object in the subset of image data objects: determine, based on the first set of embeddings, at least one image quality metric; determine, based on the set of machine learning parameters and the first set of embeddings for that image data object, at least one confidence score; and determine, based on a graph-based ranking algorithm, at least one relationship rank value. The at least one ranking engine may be further configured to determine the ranked list of the subset of image data objects based on, for each image data object in the subset of image data objects: the at least one image quality metric; the at least one confidence score; and the at least one relationship rank value.

Another general aspect includes a computer-implemented method that includes: determining an index of image data objects in user image data stored in a storage medium; determining, by at least one image group classifier, a first set of embeddings quantifying a plurality of features in a set of image data objects; processing, by the at least one image group classifier, the first set of embeddings for each image data object in the set of image data objects through a set of machine learning parameters assigned to a first group identifier; determining, by the at least one image group classifier, a subset of image data objects in the set of image data objects corresponding to the first group identifier; processing the subset of image data objects to determine a ranked list of the subset of image data objects; and displaying, based on the ranked list, at least one image data object on a graphical user interface.

Implementations may include one or more of the following features. The computer-implemented method may include: detecting, in the set of image data objects, at least one human face; and calculating, for the at least one human face, the first set of embeddings quantifying the plurality of features of the at least one human face using a first embedding model, where each image data object in the subset of image data objects includes the at least one human face corresponding to the first group identifier. The at least one face may include a plurality of faces in the set of image data object; the embeddings may quantify the plurality of features for each face of the plurality of faces; and the first group identifier may correspond to a social group corresponding to a plurality of people. The computer-implemented method may include: calculating, for the at least one human face in each image data object in the subset of image data objects, a second set of embeddings quantifying the plurality of features of the at least one human face using a second embedding model; and using the second set of embeddings to determine the ranked list of the subset of image data objects. The computer-implemented method may include: determining, for each image data object in the set of image data objects, a confidence score based on the set of machine learning parameters and the first set of embeddings for that image data object; comparing, the confidence score to a group confidence threshold, to determine the subset of image data objects in the set of image data objects corresponding to the first group identifier; and using the confidence score for each image data object in the subset of image data objects to determine the ranked list of the subset of image data objects. The computer-implemented method may include using a graph-based ranking algorithm to process the first set of embeddings to determine the ranked list of the subset of image data objects. The computer-implemented method may include: tokenizing each embedding of the first set of embeddings for each image data object in the subset of image data objects; and selectively relating, based on at least one weight value of the graph-based ranking algorithm, tokenized embeddings from a first image data object to corresponding tokenized embeddings for each other image data object in the subset of image data objects to determine the ranked list of the subset of image data objects. The computer-implemented method may include: receiving at least one user tag for at least one image data object in the subset of image data objects; and modifying at least one weight value corresponding to the at least one image data object associated with the at least one user tag. The computer-implemented method may include, for each image data object in the subset of image data objects: determining, based on the first set of embeddings, at least one image quality metric; determining, based on the set of machine learning parameters and the first set of embeddings for that image data object, at least one confidence score; and determining, based on a graph-based ranking algorithm, at least one relationship rank value. The computer-implemented method may include determining the ranked list of the subset of image data objects based on, for each image data object in the subset of image data objects: the at least one image quality metric; the at least one confidence score; and the at least one relationship rank value.

Still another general aspect includes an end-user computing device that includes: at least one processor; at least one memory; a camera configured to capture user image data; a storage medium configured to store user image data; means for determining an index of image data objects in user image data stored in a storage medium; means for determining, by at least one image group classifier, a first set of embeddings quantifying a plurality of features in a set of image data objects; means for processing, by the at least one image group classifier, the first set of embeddings for each image data object in the set of image data objects through a set of machine learning parameters assigned to a first group identifier; means for determining, by the at least one image group classifier, a subset of image data objects in the set of image data objects corresponding to the first group identifier; means for processing the subset of image data objects to determine a ranked list of the subset of image data objects; and means for displaying, based on the ranked list, at least one image data object on a graphical user interface.

The various embodiments advantageously apply the teachings of data storage devices and/or image management systems to improve the functionality of such computer systems. The various embodiments include operations to overcome or at least reduce the issues previously encountered in image management systems and, accordingly, are more efficient, reliable, and/or secure than other computing systems configured for image management. That is, the various embodiments disclosed herein include hardware and/or software with functionality to improve image grouping and retrieval, such as by training and embedding group-specific classifiers in the end user device and/or corresponding data storage device. Accordingly, the embodiments disclosed herein provide various improvements to end user devices and/or image management systems.

It should be understood that language used in the present disclosure has been principally selected for readability and instructional purposes, and not to limit the scope of the subject matter disclosed herein.

DETAILED DESCRIPTION

Figure 1:
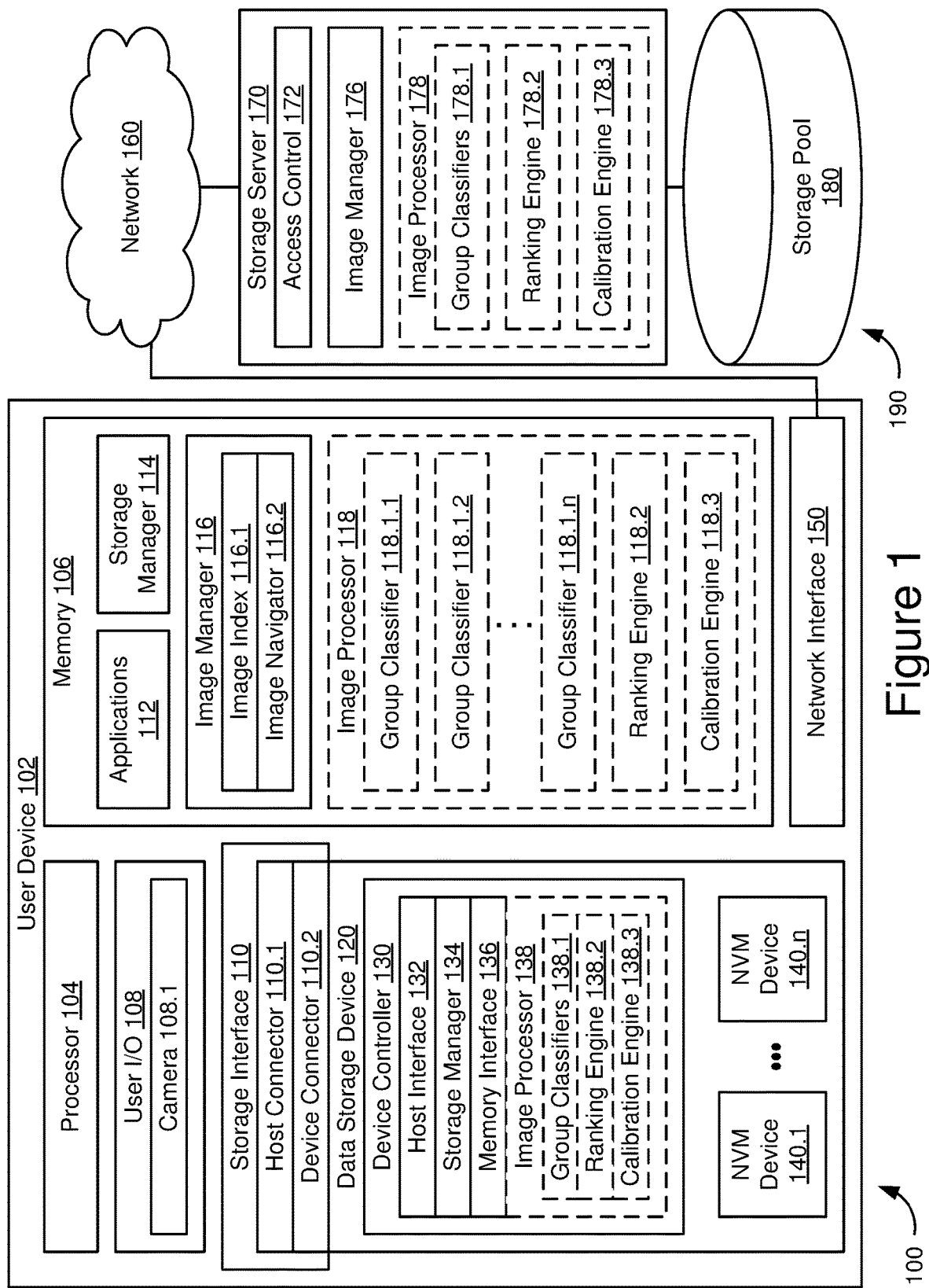
FIG. 1 schematically illustrates an example storage system with an end user device and remote image data storage server.

FIG. 1 shows an embodiment of an example data storage system 100 with an end user device 102 hosting a data storage device 120 configured to store image data and classify images in that image data using onboard group classifiers. In some embodiments, user device 102 may interface or communicate with a storage server, such as a cloud photo storage or image manager service, over network 160 for one or more functions related to image storage, management, classification, or ranking. User device 102 and/or data storage device 120 may connect to network 160 to communicate with network storage system 190 that includes storage server 170 and storage pool 180. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with user device 102. In some embodiments, user device 102 may be an end user device with an embedded computing system, such as a video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In the embodiment shown, storage device 120 is attached to storage interface 110 for host communication with user device 102. For example, user device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. Storage interface 110 may include or interconnect with a plurality of physical port connections and intermediate components that define physical, transport, and other logical channels for establishing communication with the different components and subcomponents for establishing a communication channel between user device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a host storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with user device 102 over storage interface 110. Host storage manager 134 may include configuration, background, and storage processing operations running on the general compute resources of storage device controller 130 to coordinate operation of storage device 120, host interface controller 132, and memory interface controller 136. Memory interface controller 136 may include a physical memory bus and related resources for connecting to media devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include an image processor 138 configured to process image data stored in media devices 140 for use and display by user device 102. For example, image processor 138 may be configured to use the processor and memory resources of device controller 130 to classify new images as they are stored to data storage device 120. In some embodiments, image processor 138 may include one or more image group classifiers 138.1 trained to classify images based on the presence of specific objects, such as human faces, and, more specifically, grouping images of the same person or group of people. For example, each time a new image data object is received by data storage device 120, it may process the image through one or more group classifiers 138.1 to assign corresponding group identifiers to images containing objects for that group. In some embodiments, image processor 138 may be configured with a plurality of image classifiers 138.1 trained for the groups most important to the user of user device 102, where each classifier uses a machine learning-based classifier algorithm with relatively low memory and processor requirements matched to the capabilities of the processor and memory resources of device controller 130. Group classifiers 138.1 may include group classifiers for determining a single group identifier for an image and/or group classifiers for determining a plurality of group identifiers for the image.

In some embodiments, image processor 138 may include a ranking engine 138.2 configured to rank images in the same group. For example, each time group classifier 138.1 adds a new image to a group or on a periodic basis, ranking engine 138.2 may process the images in the group to provide a ranked list ordering the images in the group from best to worst. The best rated images may then be used as thumbnails or representative images for the group, provided as suggested images for the group, or used as a display, search result, navigation, or organization for images displayed through an image manager on user device 102, such as image manager 116.

In some embodiments, image processor 138 may include a calibration engine 138.3 configured to determine the groups for group classifiers 138.1 and train them based on image data in memory devices 140. For example, calibration engine 138.3 may be configured to detect an object type, such as human faces, in each image stored in memory devices 140, use a clustering algorithm and selection criteria to determine the highest value image groups, and train a group classifier for each selected group using a subset of images relevant to that group. In some configurations, object detection and related processing may be executed when images are captured, with the object metadata being stored with the image, enabling calibration engine 138.3 to use the previously calculated object metadata for the calibration process. In some embodiments, calibration (and recalibration) may be periodic tasks that are triggered when user device 102 and/or data storage device 120 are otherwise idle to allow dedicated use of memory and processor resources of device controller 130. As further described below, in some configurations, image processor 138 and/or select functions thereof may be moved into memory 106 for use of the greater memory and processor (e.g., processor 104) resources of user device 102.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs). In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes. Image data objects may include any standardized data structure for organizing and storing digital images in raw, compressed, or vector formats. For example, image data objects may include Joint Photographic Experts Group (JPEG), tagged image file format (TIFF), bitmap (BMP), portable network graphics (PNG), and other standard image formats. In some embodiments, image data objects may include video frames extracted from video data objects, such as Motion Picture Experts Group (MPEG)-4, Windows media video (WMV), QuickTime file format (.MOV), audio video interleave (AVI), and other video format files.

In some embodiments, host, host system, or user device 102 may be coupled to network 160 through a network interface 150. In some embodiments, network 160 may operate over a wired and/or wireless network (e.g., public and/or private computer networks in any number and/or configuration) which may be coupled in a suitable way for transferring data. For example, network 160 may include any means of a conventional data communication network such as a local area network (LAN), a wide area network (WAN), a telephone network, such as the public switched telephone network (PSTN), an intranet, the internet, or any other suitable communication network or combination of communication networks.

User device 102 may be any suitable end-user computer device, such as a personal computer, a laptop computer, a tablet device, a netbook, an internet appliance, a personal digital assistant, a mobile phone, a smart phone, a gaming device, a smart appliance, a camera or video camera, or other consumer electronics device. User device 102 is sometimes called a host, host system, user system, end user device, or end user computing device depending on respective roles, configurations, and contexts. In some embodiments, user device 102 is a consumer electronics device configured to capture and store images, such as an end user computing device with a camera 108.1, such as a smartphone, tablet, digital camera, or digital video camera. In some embodiments, user device 102 may be any computing device configured to store and access data in storage device 120.

User device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and user device 102.

User device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by user device 102 for command, management parameter, and/or host data storage and transfer to and from storage device 120.

User device 102 may include one or more user input/output devices 108, as appropriate to the type of user device 102. In some embodiments, input/output devices 108 may include one or more conventional mechanisms that permit a user to input information to user device 102 such as a keyboard, mouse, pen, touch screen, microphone, accelerometer, biometric mechanisms, haptic interface, etc. In some embodiments, input/output devices 108 may include camera 108.1 comprised of image, infrared, and/or other sensors for capturing image data and converting the image data to one or more image data objects for storage, transmission, display, and other uses. Input/output devices may include one or more conventional mechanisms that output information to the operator, such as a display, printer, speaker, haptic feedback, etc.

In some embodiments, user device 102 may include one or more applications 112 instantiated in user device memory 106 for execution by user device processor 104. Applications 112 may include and/or be configured to access one or more storage management functions of storage manager 114. Storage manager 114 may include applications, services, libraries, and/or corresponding interfaces for managing the contents and operation of storage device 120 on behalf of user device 102. For example, storage manager 114 may include services for monitoring storage device parameters, such as total capacity, capacity used, and capacity available, tracking storage device input/output (I/O) history, performance, and workload, and initiating host storage maintenance functions, such as media scans, defragmentation, host data transfer or reorganization, etc. Image manager 116 may include applications, services, libraries, and/or corresponding interfaces for managing the image data contents of storage device 120 on behalf of user device 102. For example, image manager 116 may include an image index 116.1 configured to identify image data objects in storage device 120 and organize corresponding metadata describing the image data objects. Image manger 116 may also include an image navigator 116.2 configured to provide user display and navigation of the image data objects in image index 116.1, such as a graphical user interface that displays images, filenames, descriptions, etc. in a hierarchical, tagged, browsable, searchable, or otherwise organized and navigable user display.

In some embodiments, user device 102 may include an image processor 118 configured to process image data objects stored in storage device 120 for indexing, display, and navigation by image manager 116. As described above with regard to image processor 138, image processor 118 may include similarly configured group classifiers 118.1, ranking engine 118.2, and/or calibration engine 138.3. In some embodiments, device controller 120 may not have the necessary memory and/or processor capabilities for some or all functions of image processor 138 and one or more functions may be implemented by user device 102 using processor 104 and memory 106. For example, image processor 118 may include a plurality of image group classifiers 118.1.1-118.1.n configured to classify new images in groups 1-n. In some embodiments, some image classifiers may be implemented in data storage device 120 and other image classifiers may be implemented using user device 102 memory and processor resources. Similarly, in some embodiments, image processor 118 may include ranking engine 118.2 to obviate the need for ranking engine 138.2 and calibration engine 118.3 to obviate the need for calibration engine 138.3, as these may be more resource intensive compute tasks.

In some embodiments, network storage system 190 may be a cloud-based storage system supporting one or more data backup, recovery, and/or image management services. For example, storage server 170 may be a cloud server hosting an image data backup, management, and recovery application with a web, mobile application, or similar interface for storing user image data in storage pool 180. In some embodiments, storage pool 180 may be a distributed data storage system configured with redundant data storage devices providing data availability and redundancy to storage server 170. For example, storage pool 180 may include geographically distributed rack storage system configured in RAID groups and clusters for supporting various server-based applications, including storage server 170. In some embodiments, storage server 170 may be configured to receive and store image data objects from storage device 120 based on an image storage configuration defined by image manager 116 and/or a corresponding cloud-based image manager 176. In some embodiments, storage server 170 may include access control 172 for receiving user credentials, such as username, password, and security certificates, for establishing secure image data transfer between data storage device 120 and storage server 170 and otherwise providing the functions of image manager 176 over network 160.

In some embodiments, image data from data storage device 120 may be stored, through image manager 176, to storage pool 180 and enable some functions of image processors 118 and 138 to be hosted remotely on storage server 170 as image processor 178. For example, due to the higher memory and processing requirements of the calibration stage, calibration engine 178.3 may instantiated in storage server 170. In some embodiments, calibration engine 178.3 may generate group classifiers 178.1 and deploy them over network 160 to user device 102 and/or storage device 120 as group classifiers 118.1 and/or group classifiers 138.1 In some embodiments, ranking engine 178.2 may be executed periodically by storage server 170 to provide ranked lists and related parameters to user device 102 and/or storage device 120 to enable ranking engines 118.2 and/138.2 to perform insertion of a new image in a group or re-ranking using less resources. In some embodiments, a user may configure some or all image data to not be transmitted over network 160 or stored remotely in storage pool 180 and may require that all image processor functions be executed locally by image processor 118 and/or image processor 138.

Figure 2:
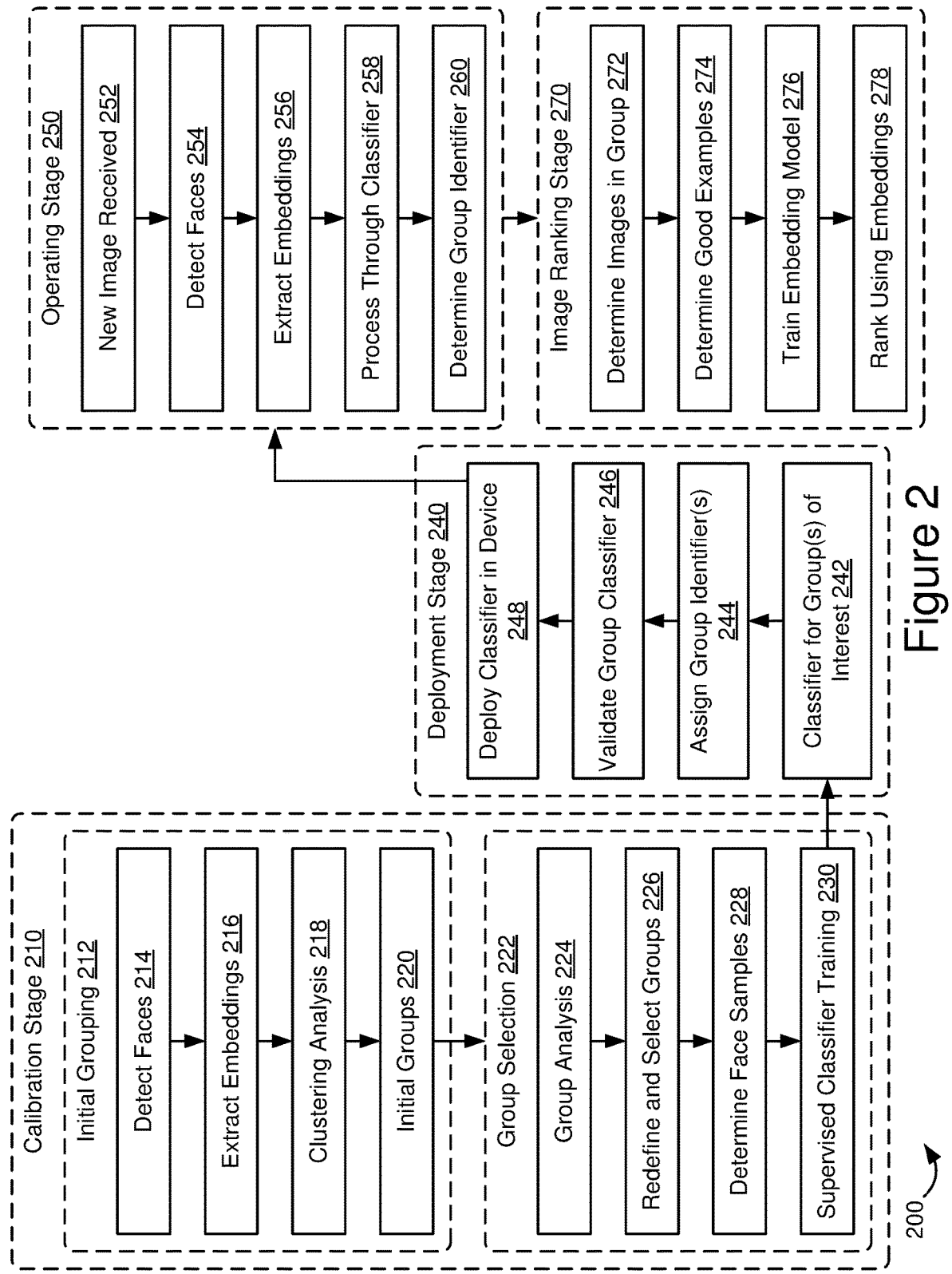
FIG. 2 schematically illustrates an example method of calibrating and deploying image group classifiers in an end user device.

FIG. 2 shows a schematic representation of a method 200 for calibrating and deploying image group classifiers in an end user device, such as user device 102 in storage system 100 of FIG. 1. In some embodiments, method 200 may proceed according to a plurality of stages. For example, a calibration stage 210 may be used to generate one or more image group classifiers based on an existing collection of images, such as the images currently stored in a storage device. A deployment stage 240 may assign the selected group classifiers to a run-time environment in the end user device and an operating stage may use the group classifiers to classify new images. An image ranking stage 270 may be used to rank or re-rank the images assigned to a particular group.

In some embodiments, method 200 may be used for clustering and organizing personal photographs, such as images of family and friends captured by and stored on a mobile phone. For such applications, the exact number of relevant groups may be different from user to user, but may generally be limited to a relatively small number of frequently occurring people and social groups (e.g., household, co-workers, extended family, sports team, book club, etc.) of interest. It may be preferable to execute some or all stages of method 200 locally on the end user device or even based solely on the resources of the data storage device storing the images. Local processing may improve efficiency, reduce bandwidth usage (and enable offline use), improve data security, and prevent sensitive information (e.g., private images, biometric information, etc.) from being transferred over public networks, such as the internet. There may also be configurations where cloud-based resources or another edge device (e.g., personal computer) are also used, such as in conjunction with cloud-based backup and photo management apps. Data processing may include various filtering steps that may be inserted for calibration stage 210, operating stage 250, and/or image ranking stage 270 to reduce the number of images to be processed at each stage and improve image quality and/or other image characteristics to improve performance of the various machine learning algorithms and resulting models. In some configurations, user input may be used at various stages to assist with selection, identification, and prioritization of groups and/or image content or features for making grouping and ranking decisions. Similarly, image groups, image group classifiers, grouping decisions, and ranking decisions may be validated to enable tuning and retraining as needed. In some embodiments, object locations, embeddings, confidence scores, and other metadata generated through the various stages may be stored for reuse by later stages and/or some tuning and retraining operations.

Calibration stage 210 may include two distinct steps or sub-stages for generating image group classifiers. Calibration stage 210 may include an initial grouping sub-stage 212 for determining a number of initial clusters present in the set of images and a group selection sub-stage 222 for selecting and training the image group classifiers of interest.

At block 214, initial grouping sub-stage 212 may begin with detecting faces (or other target objects) in each image in the set of images targeted for calibration. For example, an object detector may be configured for detecting and bounding each human face within an image based on a machine learning algorithm previously trained for human face detection. In some device configurations, face detection may be executed when images are captured and related object metadata, such as the face bounding box, may be stored in image metadata for the image. In some embodiments, calibration may use the previously generated object metadata, rather than running a separate face detection during calibration. At block 216, embeddings, such as facial feature vectors, may be extracted from each detected human face. For example, a previously trained embedding model for facial recognition may be used to extract a set of feature vectors quantifying various facial features and (distance/position) relationships among them for each detected face in the images. In some embodiments, an available face detection algorithm and embedding model, such as FaceNet, ArcFace, RetinaFace, MobileFaceNet, etc. may be used. The size, complexity, and processing resource requirements of the face detection algorithm may be governed by the location of the processing. For example, a lightweight model may be used for edge devices, such as a data storage device or end user device, and heavier weight models may be reserved for cloud or server-based calibration operations. In some embodiments, object position (face box), embeddings, and confidence scores may be stored as extended metadata data for each image data object corresponding to the processed images.

At block 218, clustering analysis may be performed on the images and, more specifically, the embeddings from the faces detected in each image. For example, a clustering algorithm may be run against the subset of images that include detected faces and may cluster images based on single faces and/or groups of faces in the same image. In some embodiments, an unsupervised clustering method, such as density-based spatial clustering of applications with noise (DBSCAN), Chinese whispers, or another graph-based clustering algorithm and corresponding thresholds for identifying and ranking clusters. For example, each detected face may be treated as a node and similarity of embeddings and/or other metadata may be treated as links, resulting in clusters among detected faces with the most similar embeddings and/or other metadata. In some embodiments, sets of detected faces in images may also be used for clustering social groups. At block 220, a set of initial groups may be determined from the set of images processed at block 214. For example, clustering analysis 220 may include statistical thresholds for determining clusters representing a reoccurring face and/or social group with a desired level of statistical significance and minimum threshold number of nodes (images). In some configurations, each group may include a single person and the clustering algorithm may determine multiple groups including the same person. The initial groupings may be passed to group selection sub-stage 222.

At block 224, group selection sub-stage 222 may begin with group analysis of the initial groupings from initial grouping sub-stage 212. For example, a set of group selection criteria may be applied to the initial groupings and related metrics to determine the most relevant groups from among the initial groups. Group analysis may be based on metadata generated by detection and clustering in initial grouping sub-stage 212 and/or other image metadata generated as part of the image capture and management processes prior calibration stage 210. For example, group analysis may use face counts, creation time, geo-location, storage location (e.g., folder structures or other organization information related to image file management), image source tags, content tags, and cluster size to determine a plurality of metrics (sums, averages, modes, greatest/least values, etc.) related to the metadata parameters for each initial group and the images in that cluster. In some embodiments, group analysis may include generation of additional analytics for each initial group and/or among groups. For example, relationship links among initial groups may be determined using graph-based relationship algorithms to determine which faces and corresponding groups in the same image are linked, compute group distance and similarity between/among groups, and/or otherwise quantify the relationships among the initial groups. In some embodiments, user inputs may be received to assist in group analysis. For example, users may be provided with an interface that displays one or more images from a group and allows the user to tag the group with a name, relationship (child, parent, friend, etc.), social group (family, work, soccer team, etc.), priority, and/or other metadata tags to assist in group selection.

At block 226, the initial groups may be redefined and selected for generation of a group image classifier. For example, the static metadata, metrics, relationship values, and user tags determined at block 224 may be used as parameters for evaluating a plurality of selection rules. In some embodiments, group selection thresholds may be configured for one or more rules to enable selection of groups with counts, distributions, relationships, or other metrics meeting the selection threshold. In some embodiments, one or more group parameters may be used to rank the groups, such that higher values (e.g., counts or relationship ranking values) may place the initial groups in an order and a number of groups may be selected (e.g., top 3 groups, top 10 groups, top 5 groups in different categories, etc.). Thresholds and ranks may also be used to eliminate groups, such as eliminating or consolidating groups with high similarity that are likely to be the same person or group. User tags received at block 224 may be used for group selection by allowing the user to give priority to particular groups, relationships, or other group tag information that is used in the selection rules at block 226. For example, the user may specifically tag individual groups with selection priority or define classes of tags (e.g., family relationships) that may override other group selection criteria. In some embodiments, group analysis and selection may be executed automatically based on a set of group selection rules, with or without manual intervention or validation by a user.

At block 228, face samples may be determined for training an image group classifier for each selected group. For example, some or all of the images identified in each initial group may be selected to use for training, depending on the number of images in the corresponding group set. In some embodiments, training images may be filtered or ranked and only a subset of images for each selected group may be selected. For example, a target range of images may be determined for the training data set, such as 1-1000 faces/images per group. Images may be filtered based on one or more characteristics, such as the source or resolution of the image, size of the face bounding box, face angle (preferring front/mug shot angle), full set of face landmarks/feature vectors (no face coverings or occlusions), and/or other metadata characteristics.

At block 230, a machine learning-based classifier algorithm is selected and trained using the images selected at block 228 for each group selected at block 226. For example, an image classifier based on a machine learning algorithm (including neural network models), such as support vector machine (SVM), naive Bayes, or K-nearest neighbours (KNN) algorithms targeting the embeddings and/or other metadata related to the face images in the set of training images for the group. In some embodiments, the image classifier may be configured as a single group or binary classifier that returns a single group identifier for images meeting the classification criteria of that image classifier. In some embodiments, the image classifier may be configured as a multigroup classifier capable of determining whether multiple groups are present and returning an appropriate set of group classifiers. In some embodiments, classifier training may be monitored and verified during the training process based on one or more training metrics and related thresholds. The output of block 230 and calibration stage 210 may be a plurality of image classifiers for deployment stage 240, where each image classifier is specifically trained for identifying a face or group of faces (social group) of interest in existing or new images.

At block 242, at least one image classifier corresponding to a group of interest to the user of an end user device has been generated. Each image classifier may be assigned a unique group identifier at block 244. For example, an arbitrary unique identifier, such as a sequential group number, may be generated and used to track initial groups through the calibration process, assigned as groups are selected, and/or assigned to the trained classifier. In a multigroup classifier configuration, a group classifier may correspond to multiple groups (or individuals) of interest and be configured to return an array of group identifiers and/or confidence values associated with each group identifier. For example, a multigroup group classifier may classify a face in an image as belonging to group 1, group 2, or group 3. In another example, an image containing multiple faces may allow the multigroup group classifier to identify faces belonging to group 1 and group 2. A multigroup group classifier may return multiple tag values (e.g., group identifiers) and/or multiple confidence scores (which may be associated directly with a tag value or translated to a tag value based on value position and/or a confidence threshold). In some embodiments, the unique group identifier may include or be associated with one or more user tags, such as image tags provided during calibration stage 210, to enable more user-friendly management of image classifiers.

At block 246, each image classifier may be validated. For example, the group classifier may be used to process the images originally provided in calibration stage 210, such as the images from the original face detection at block 214. In some embodiments, validation may use the embeddings extracted at block 216 to avoid additional (redundant) processing overhead and the resulting classifications may be compared to corresponding images in an initial group that was used to generate the image classifier. For example, the degree of overlap between the initial group and the output of the trained image classifier may be compared to an overlap threshold to validate the image classifier. In some embodiments, a set of validation rules may be applied, such as using multiple faces in one image to confirm different individuals or using the same face in similar locations in adjacent frames of a video clip or photo burst (series of photos taken in quick succession). In some embodiments, manual validation, such as showing images having varying confidence levels to a user to have them indicate whether the same person or group is present in each image may be used to validate the performance of the group classifier. At block 248, the image classifiers may be deployed to the end user device for use in classifying current and/or future images stored in the end user device. For example, each image classifier may be stored in an image processor in the user device or an associated data storage device to classify images on those devices during operating stage 250.

Operating stage 250 may include ongoing operation of the end user device after deployment of the image group classifiers. For example, a smartphone, tablet, or digital camera may store a number of image group classifiers selected for relevance to the user of that device in calibration stage 210 and use the image group classifiers to classify new images captured or received by the device. At block 252, a new image may be received by the user device. For example, a smartphone may capture a new photo or video with its built-in camera or a new photo may be received by text or downloaded from social media. At block 254, faces may be detected in the new image using a face detector. For example, the smartphone may be equipped with a face detection algorithm, which may be similar to the detection algorithm used in blocks 214 and 216, that processes each new image as it is captured or on a periodic basis when processing resources are available. At block 256, embeddings may be extracted from each detected face in the image. For example, the face detection algorithm may include an embedding model for determining feature vectors from the detected faces. At block 258, the embeddings may be processed through each image group classifier (and/or one or more multigroup group classifiers that handles multiple group identifiers). For example, each image group classifier may receive the embeddings in series and output a group confidence score for the detected faces in that image. At block 260, one or more group identifiers may be determined for the image. For example, each group classifier may have a corresponding group classification threshold based on the confidence score returned by that group classifier and images with confidence scores meeting the group classification threshold may be assigned to that group, such as by associated the class identifier with the image as a metadata tag or entry in a metadata table. In some embodiments, operating stage 250 may also include monitoring a number of faces not assigned group identifiers. The number of unknown faces may be compared to an unknown face count threshold for determining when calibration stage 210 is re-run to determine whether new group classifiers are needed.

Image ranking stage 270 may rank, organize, and/or store images assigned to groups for a better user experience with image retrieval, navigation, and display. For example, once images within a group (e.g., images assigned the same group identifier in deployment stage 240 and/or operating stage 250) are ranked, higher ranked images may be used as thumbnails or cover images for the group, create highlights, moments, or memories, and/or prioritized in search results and/or lists of images stored in a location. In some embodiments, image ranking may be performed based on a limited number of metrics, such as the image grouping confidence score, or graph-based relationship ranking, such as applying a hyperlink-induced topic search (HITS) algorithm, PageRank algorithm, or SimRank algorithm to the embeddings generated during prior stages. Metric ranking (e.g., confidence score order from highest to lowest) or graph-based relationship ranking may be performed on image group sets determined during deployment stage 240 and throughout operating stage 250 and new images in a group may be inserted into the rankings based on their metrics or relationship ranks. In some embodiments, an alternate embedding model trained specifically for the image group and using the best images in the image group may be used to provide a more accurate and efficient ranking of images.

At block 272, the set of images assigned to a group may be determined. For example, a current set of images with the group identifier may be determined from the image metadata stored in the user device. At block 274, the set of images assigned to the group may be filtered to determine the best representatives of the group using image metrics. For example, group confidence score, image quality metrics, or manually curated labelled faces in the wild (LFW) methods may be used to create a refined set of images containing only "good faces". Similarly, filters that exclude bad face angles, bad lighting, and/or occlusions may be used to improve the quality of the training data set for determining the ranking embedding model. At block 276, the embedding model may be trained using the good example subset of images determined at block 274. For example, a machine learning algorithm for determining embeddings from a detected faced may be trained using the subset of images to create a highly relevant set of feature vectors that can be extracted from images in the group. At block 278, the group embedding model may be used to extract new sets of embeddings for each image in the group and rank the images based on relationships between the embeddings to provide a more accurate and efficient ranking model. A ranked value and/or ranked list of images in the image group may then be returned to an image manager for use in storing, displaying, and navigating images in the group. In some configurations, user input may be used to assist in ranking, such as giving embeddings from an image tagged as a favorite a higher weight in a graph-based relationship ranking. In some configurations, multiple ranking methodologies or ranking factors may be related through a combined ranking algorithm, such as a weighted sum or average of metric-based factors (e.g., confidence score), user tags or ratings, image quality factors, and relationship rankings. A combined ranking score may be used to order the images in the group from highest rank to lowest rank.

Figure 3:
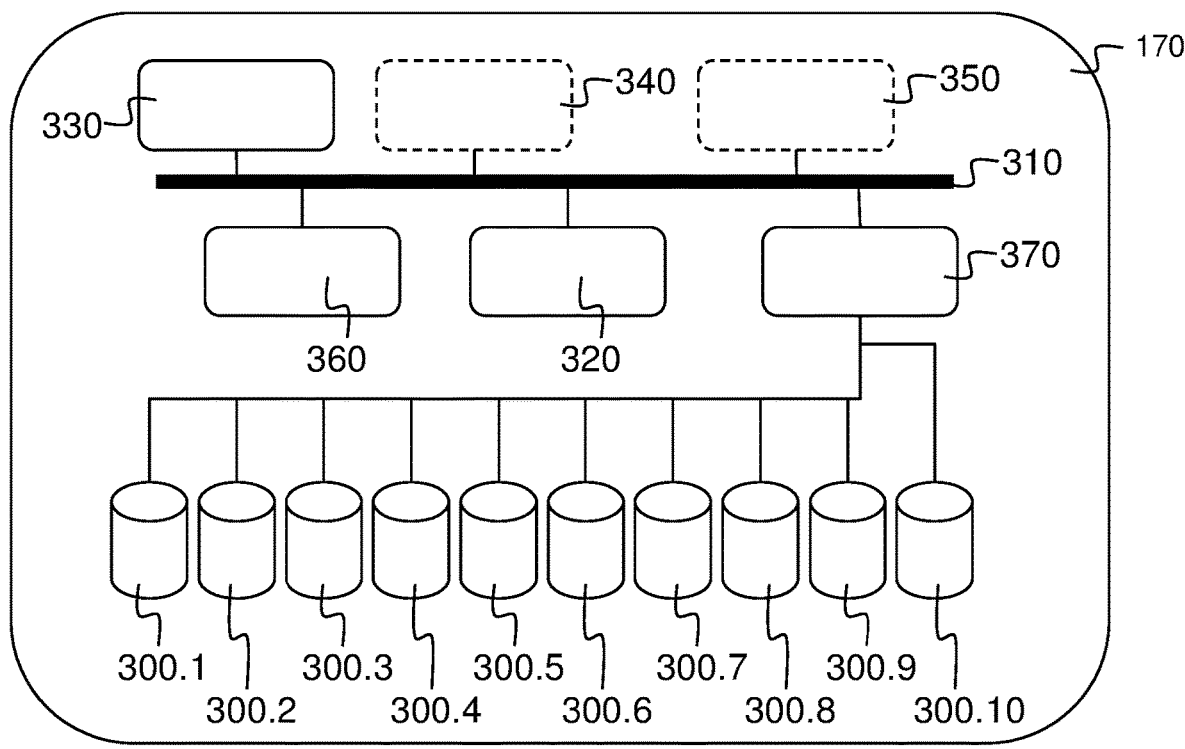
FIG. 3 schematically illustrates a storage server of the storage system of FIGS. 1 and 2.

FIG. 3 shows a schematic representation of a storage server 170. Storage server 170 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller. Bus 310 may include one or more conductors that permit communication among the components of storage server 170. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage server 170 to communicate with other devices and/or systems, for example mechanisms for communicating with user device 102 over network 160.

Figure 4:
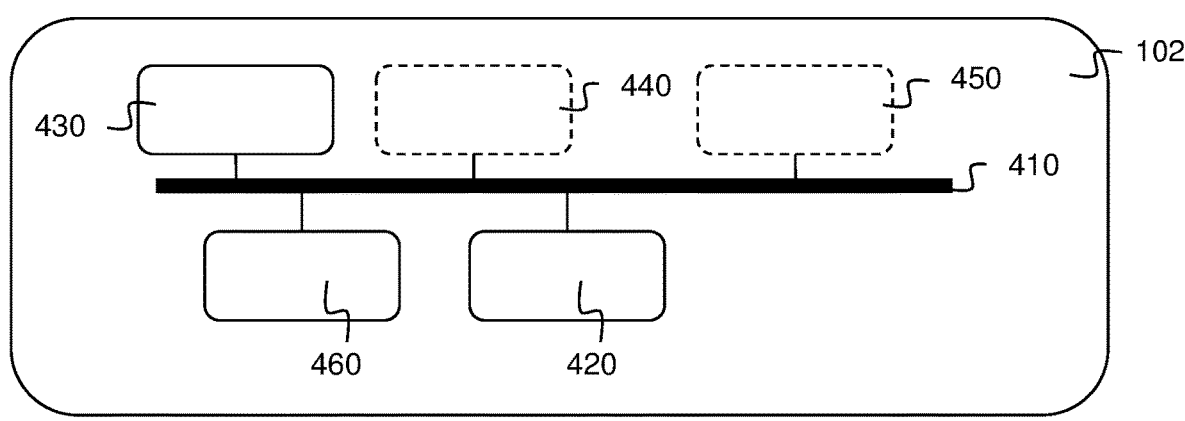
FIG. 4 schematically illustrates an end user device of the storage system of FIGS. 1 and 2.

FIG. 4 shows a schematic representation of an example user device 102. User device 102 may comprise a bus 410, a host processor 420, a host memory 430, one or more optional input units 440, one or more optional output units 450, and a communication interface 460. Bus 410 may include one or more conductors that permit communication among the components of user device 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. In some embodiments, host memory 430 may include both operating memory, such as memory 106, and one or more data storage devices accessible over a storage interface, such as data storage device 120. Software instructions may be stored in a combination of operating memory and non-volatile memory and may be loaded from non-volatile memory into operating memory for execution. For example, applications 112, storage manager 114, image manager 116 and/or image processor 118 may be instantiated in instructions, operations, or firmware stored in host memory 430 for execution by host processor 420.

An optional input unit 440 may include one or more conventional mechanisms that permit an operator to input information to user device 102 such as a keyboard, touchscreen, a mouse, a pen, voice recognition and/or biometric mechanisms, etc. In some embodiments, optional input unit 440 may include image, audio, infrared, and/or other sensors for camera or other consumer electronics functions. Optional output unit 450 may include one or more conventional mechanisms that output information to the operator, such as a display, a printer, a speaker, etc. Communication interface 460 may include any transceiver-like mechanism that enables user device 102 to communicate with other devices and/or systems. In some embodiments, communication interface 460 may include one or more peripheral interfaces, such as a PCIe, USB, SD, SDXC, or other interface for connecting to storage device 120 and/or a network interface for communicating with storage device 120 over a fabric network.

Figure 5A:
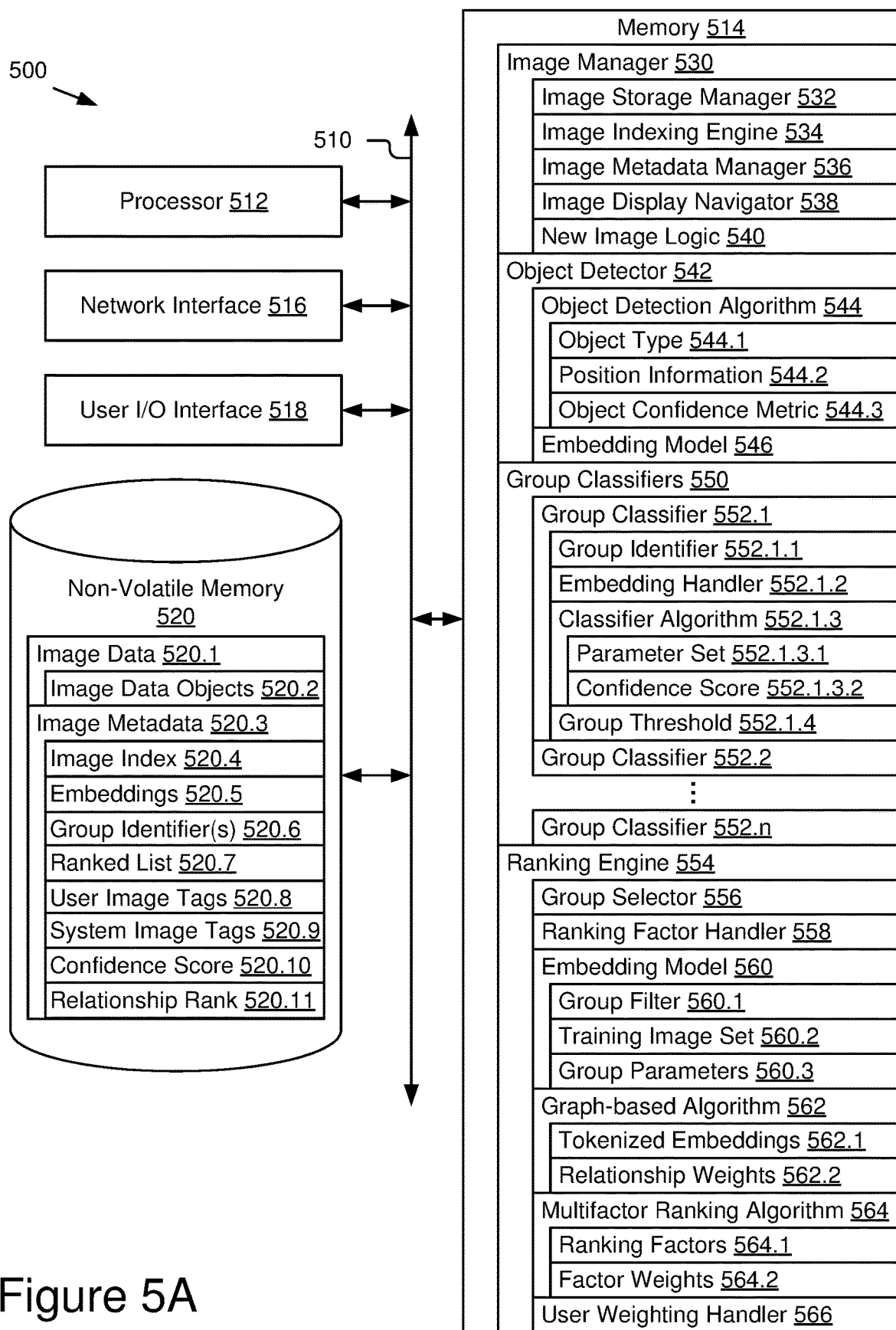
FIGS. 5A and 5B schematically illustrates some elements of the storage system of FIGS. 1 and 2 in more detail.
Figure 5B:
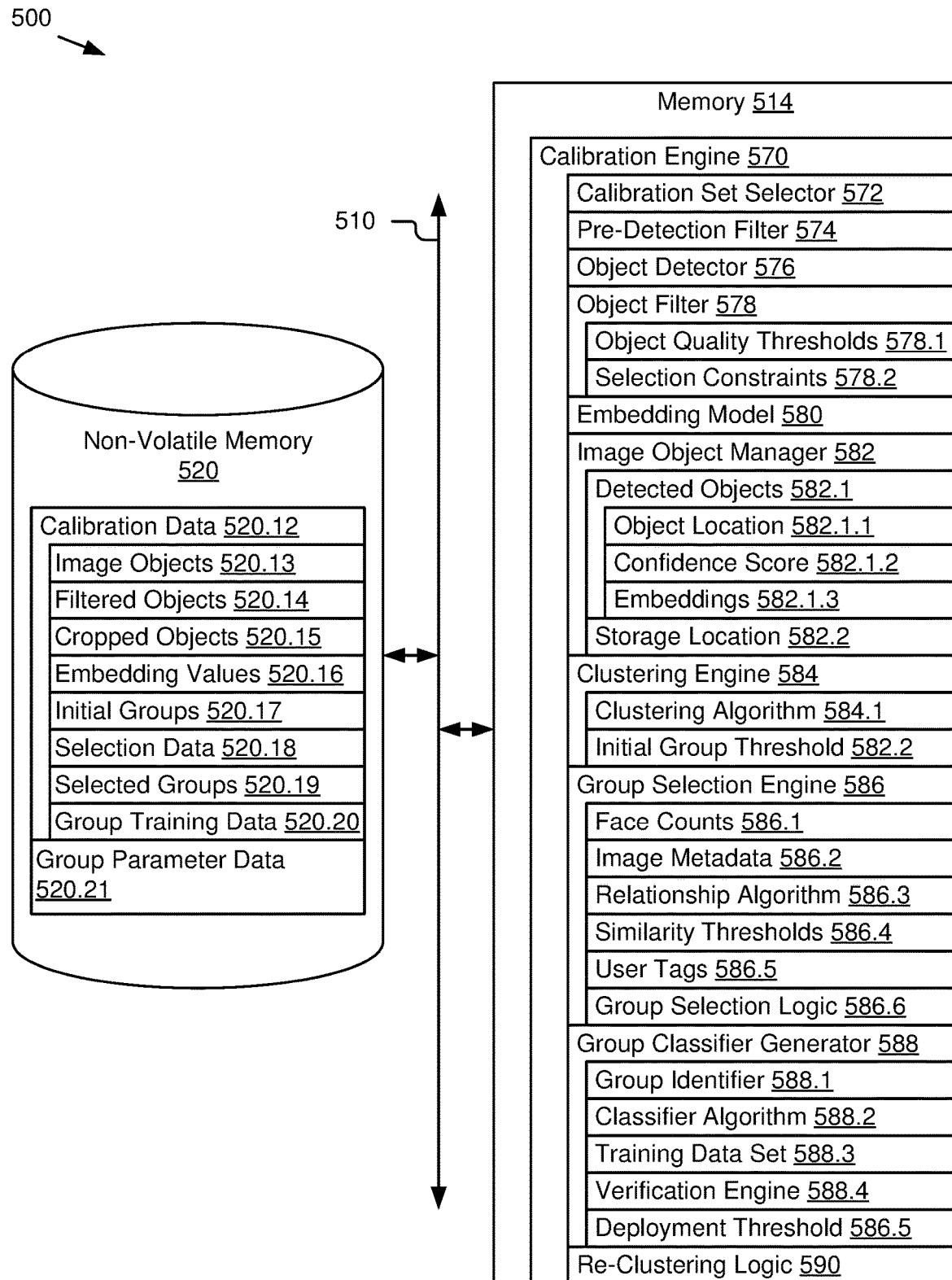

FIGS. 5A and 5B schematically shows selected modules of a user device 500 configured for using specifically trained image group classifiers to classify images captured, received, and/or stored by the user device. User device 500 may incorporate elements and configurations similar to those shown in FIGS. 1-2 and 4. For example, user device 500 may include a storage device configured as storage device 120 in storage system 100, where storage device 120 includes object detector 542, group classifiers 550, and ranking engine 554, in addition to non-volatile memory 520. In other configurations, processor 512, memory 514, and all modules therein may be system resources of user device 500. In still other configurations, one or more modules from memory 514 and related data from non-volatile memory 520 may be based in a remote storage server 170, such as calibration engine 570 being executed using server resources and deploying group classifiers 550 back to user device 500.

User device 500 may include a bus 510 interconnecting at least one processor 512, at least one memory 514, and at least one interface, such as network interface 516 and user I/O interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. Network interface 516 may include a physical interface for wired or wireless communication with a network, such as a local area network (LAN), wide area network (WAN), Converged Network, the internet, etc. User I/O interface 518 may include a physical interface for wired or wireless communication with one or more interface devices, such as input devices or output devices. User I/O interface 518 may include interfaces with I/O devices built into user device 500, such as displays, touchscreens, microphones, cameras, speakers, etc. and/or I/O devices attached through an external interface, such as a USB interface for connecting mouse, keyboard, pen, camera, or other peripherals and/or wired or wireless connections for external displays, speakers, microphones, etc.

User device 500 may include one or more non-volatile memory devices 520 configured to store image data 520.1. For example, non-volatile memory devices 520 may include a plurality of flash memory packages organized as an addressable memory array and/or any data storage device, such as data storage device 120 in FIG. 1. In some embodiments, non-volatile memory devices 520 may include NAND or NOR flash memory devices comprised of single level cells (SLC), multiple level cell (MLC), triple-level cells (TLC), quad-level cells (QLC), penta-level cells (PLC), etc. In some embodiments, non-volatile memory devices 520 may include the storage medium of a storage device, such as NVM devices 140 in storage devices 120.

User device 500 may include a plurality of modules or subsystems that are stored and/or instantiated in memory 514 for execution by processor 512 as instructions or operations. For example, memory 514 may include an image manager 530 configured to receive, index, organize, and enable user interaction with image data objects 520.2 stored in non-volatile memory 520. Memory 514 may include an object detector 542 configured to detect a predetermined object type in image data objects 520.2. Memory 514 may include at least one group classifier 550 configured to determine whether image data objects 520.2 are assigned to a particular image group based on features of one or more objects detected by object detector 542. Memory 514 may include a ranking engine 554 configured to rank objects assigned to the same group for use and display by image manager 530. Memory 514 may include calibration engine 570 (FIG. 5B) configured to determine, generate, and train group classifiers 550.

Image manager 530 may include an interface protocol and/or set of functions, parameters, and/or data structures for organizing image data objects 520.2 and related image metadata 520.3 to enable user management, display, navigation, and other uses of image data objects 520.2. For example, image manager may be an application or service of user device 500 that a user accesses to identify, navigate, and display photos and videos stored on user device 500. In some embodiments, image manager 530 may include a plurality of hardware and/or software modules configured to use processor 512 and memory 514 to handle or manage defined operations of image manager 530. For example, image manager 530 may include an image storage manager 532 configured to receive and store image data objects 520.2 in non-volatile memory 520. Image manager 530 may include an image indexing engine 534 configured to determine all image data objects 520.2 stored in non-volatile memory 520 and identify their storage locations and various system or object metadata for each image data object 520.2. Image manager 530 may include an image metadata manager 536 configured to store image metadata 520.3 in one or more data structures in non-volatile memory 520, such as image metadata tables and/or metadata tags associated with individual images and/or storage locations. Image manager 530 may include an image display navigator 538 configured to provide a graphical user interface for a user to selectively display and navigate between images. Image manager 530 may include new image logic 540 configured to determine how new images received or generated by user device 500 are handled.

Image storage manager 532 may include a utility or service that allows image data objects to be stored, retrieved, moved, deleted, etc. in storage locations in non-volatile memory 520. For example, image storage manager 532 may be integrated into a general file manager that enables a variety of file types to be stored and managed within non-volatile memory 520. Image storage manager 532 may include both general file management functions and file management functions that are specific to image file types or other image data objects. Image indexing engine 534 may operate in conjunction with image storage manager 532 to determine all image file types stored in non-volatile memory 520. For example, indexing engine 534 may construct an index of files stored in non-volatile memory 520 to assist in retrieval and use of files by other applications. Indexing engine 534 may search for images during initialization, receive notification of image file types when received by image storage manager 532, and/or run periodic indexing searches, such as periodic background scans as processing resources are available. Indexing engine 534 may generate and/or add image entries or records to image metadata 520.3 to generate image index 520.4. Indexing engine 534 may include storage location, image file type and related information, in image index 520.4. Image metadata manager 536 may use image index 520.4 to store other metadata in image entries corresponding to a particular image. Image metadata manager 536 may be configured to manage basic system and file metadata (system image tags 520.9) associated with each image file and supplement it with metadata generated by other functions or modules, such as object detector 542, group classifiers 550, ranking engine 554, and/or calibration engine 570. Image metadata manager 536 may also receive user image tags from image manager 530 and store them in image metadata 520.3 as user image tags 520.8.

Image display navigator 538 may include graphical user interface functions configured to selectively display images to a user through one or more graphical user interface displays associated with user device 500. For example, image display navigator 538 may include the image navigation and display functions of image manager 530. In some embodiments, image display navigator 538 may use image index 520.4 and/or other image metadata 520.3 to display listings of image files and enable navigation among list, thumbnail, and full image views, as well as enabling image search and/or navigation by storage location, hierarchy, metadata tags, groups, rank orders, navigation history, and other image organization and/or selection paradigms. In some embodiments, image display navigator 530 may access group identifiers 520.6 for displaying selected groups of images and/or ranked list 520.7 for selectively displaying images within a selected group according to their rank (relative to other images in their same group). Group classifier 550 and/or ranking engine 554 may provide group identifiers and/or group rank (position in a ranked list for the group) for new images to image manager 530 for storage by image metadata manager 536 and use by image display navigator 538.

New image logic 540 may include logic triggered by new image data objects identified by image manager 530. For example, when a new image is captured by a camera associated with user device 500, received through network interface 516 (such as an image attached to text or e-mail, downloaded from a website, or received over social media), or identified by image storage manager 532 and/or indexing engine 534, new image logic 540 may be initiated. In some embodiments, new image logic 540 may include a set of logical rules to be evaluated and related functions to be executed for each image received. For example, when a new image is captured or received, it may initially be stored by image storage manager 532, indexed by image indexing engine 534, and system and file-type metadata, such as format, resolution, size, time, location, etc., stored in image metadata 520.3. New image logic 540 may also trigger object detector 542 to attempt to detect an object type, such as human faces, within the new image. If at least one human face is detected, the object type and embeddings 520.5 may be stored in image metadata 520.3 for that image and embeddings 520.5 (and other metadata) may be passed to image classifiers 550 (for the detected object type). Image classifiers 550 may return group identifiers 520.6 for any group classifiers with a positive result for the detected object or objects in the image, such as one or more faces being associated with a particular group. In some embodiments, a multigroup group classifier may evaluate multiple individuals and/or groups and return any corresponding group identifiers. If at least one group identifier is returned, new image logic 540 may invoke ranking engine 554 to determine a rank for the new image within the group. In some embodiments, new image logic 540 may include one or more sets of filter criteria that may exclude a new image at various stages of new image processing. For example, images may be filtered for image quality, image source, or image file type prior to object detection to reduce the number of object detection operations. Similar filters may be used prior to group classification or ranking.

Object detector 542 may include an interface protocol and/or set of functions, parameters, and/or data structures configured to detect the presence of one or more objects of a predefined object type in an image. For example, object detector 542 may be configured and trained for a particular object type, such as cars, license plates, packages, animals, human faces, etc. Object detector 542 may be based on an object detection algorithm 544 selected from machine learning-based object detection algorithms and trained with an appropriate training data set for the type of object being detected. For example, a number of human face object detectors are available and may be pre-trained based on large, verified data sets. User device 500 may be configured with one or more object detectors associated with different object types. For example, one object detection algorithm 544 may be selected for a human face object type 544.1 and another object detection algorithm 544 may be selected for a dog object type 544.1. Each object detection algorithm 544 may include a corresponding object type 544.1 and return position information 544.2 and an object confidence metric 544.3 for each instance of the object detected in the image. For example, object detector 542 may use a single pass or double pass method and a trained neural network model to detect any number of objects of object type 544.1 and return a bounding box (or corresponding coordinates) for the object location of each object detected. In some embodiments, position information 544.2 may include position information values, such as the coordinates for a bounding box, in an output array or similar data structure for a plurality of detected objects. For example, object boundary data, such as two horizontal positions and two vertical positions to define a boundary box within the image frame, may be returned with a delimiter between each detected object. If multiple object detectors are operating, position information 544.2 for each object instance of each object type may be determined and corresponding position values returned. In some embodiments, each object detector may return a tag or key-word representing object type 544.1 appended to position information 544.2. Object detector 542 may also return object confidence metric 544.3 for each object detected and corresponding set of position information 544.2 returned. For example, object detector 542 may return an object detected confidence value between 0 and 1 (0-100%), corresponding to a percentage of certainty generated by the machine learning model.

In some embodiments, object detector 542 may include an embedding model configured to extract embedding values quantifying a plurality of features describing the detected object. For example, a human face may be represented by a plurality of feature vectors corresponding to various facial features and their relative sizes, positions, and relationships. In some embodiments, established object detectors may be trained using large, verified data sets that may define a widely used population-based embedding model for quantifying feature vectors according to established standards. This may support use of the resulting embeddings across multiple applications and platforms and embeddings 520.5 may be stored as metadata associated with a particular image and may be transferred with that image. Embedding model 546 may generate a set of embedding values quantifying feature vectors based on a general population standard. In some embodiments, object detector 542 may return the set of embeddings from embedding model 546 associated with each object detected and appended to object type 544.1, position information 544.2, and object confidence metric 544.3

Group classifiers 550 may include an interface protocol and/or set of functions, parameters, and data structures for classifying an image based on one or more sets of embeddings from object detector 542. For example, each group classifier 552.1-552.n may be configured to determine whether an image containing an object or multiple objects belongs to a particular group of similar images, such as images of the same person or the same group of people. As discussed elsewhere, each group classifier 552.1-552.n may be trained for a specific group that is relevant to the user for automatic discovery and organization of images according to relevant groups. Embeddings from object detector 542 may be processed sequentially (or in parallel if processing resources allow) by each group classifier to determine whether a target image belongs in each group. Images may belong to one group, multiple groups, or no groups. In some embodiments, each group classifier 552 may be configured to return a binary indicator and a group confidence metric. In some embodiments, one or more group classifiers 552 may be configured as multigroup group classifiers and return a plurality of group identifiers and/or corresponding group confidence metrics. For example, a multigroup group classifier could be trained to detect the user, the user's spouse, the user's son, and the user's daughter and return confidence values for the presence of each in any given image, as well as combinations, such as the couple (user and user's spouse) or the kids (user's son and user's daughter). Each of these groups may be assigned an integer group identifier value, such as 1 for user, 2 for spouse, 3 for son, 4 for daughter, 5 for couple, and 6 for kids. The multigroup group classifier may also have a return value for other faces that do not correspond to any of the groups, such as a 0 value that identifies there are bystanders or unknown people in the image.

Example group classifier 552.1 may be configured with corresponding group identifier 552.1.1, embedding handler 552.1.2, classifier algorithm 552.1.3, parameter set 552.1.4, and group threshold 552.1.5. For example, group classifier 552.1 may be configured for a human face object type and trained to assign similar human faces to a group. Group classifier 552.1 may include a group identifier 552.1.1 that uniquely identifies the group the classifier is trained to identify. For example, group classifier 552.1 may have been trained to identify the user's spouse and be associated with a group identifier value of "SPOUSE". Group classifier 552.1 may include an embedding handler 552.1.2 configured to receive a set of embedding values corresponding to a set of feature vectors detected by object detector 542. For example, embedding handler 552.1.2 may receive series of embedding values that map to a predetermined configuration of feature vectors for one or more detected human faces. Group classifier 552.1 may process the set of embedding values for objects in the image using classifier algorithm 552.1.3. Classifier algorithm 552.1.3 may include a machine learning algorithm and corresponding parameter set 552.1.3.1 generated from a training data set specific to images containing the objects in the group. Selection and training of classifier algorithm 552.1.3 may be further described with regard to calibration engine 570. Classifier algorithm 552.1.3 may be configured to return a group confidence (or probability) score 552.1.3.2 for the image being analyzed. For example, classifier algorithm 552.1.3 may generate a binary value indicating that the objects in the image meet the group criteria (such as 1) or do not meet the group criteria (such as 0) and group confidence score 552.1.3.2 for the binary indicator returned. In another example, classifier algorithm 522.1.3 may generate one or more integer values indicating whether one or more object(s) in the image meet the group criteria for multiple groups (e.g., each integer value may be or map to a group identifier), and may also return corresponding group confidence scores. For example, classifier algorithm 552.1.3 may return a group confidence score between 0 and 1 (0-100%), corresponding to a percentage of certainty generated by the machine learning model. In some embodiments, group classifier 552.1 may include a group threshold 552.1.4 configured to determine whether or not group identifier 552.1.1 is assigned to the image. For example, group threshold 552.1.4 may include a threshold value corresponding to group confidence score 552.1.3.2 and requiring that the confidence score meet or exceed the threshold value to assign the image to the group. Group classifier 552.1 may be configured to return both the binary decision (group identifier 552.1.1 to store in group identifier(s) 520.6 for a positive determination) and group confidence score 552.1.3.2 to store in confidence score 520.10.

Ranking engine 554 may include an interface protocol and/or set of functions, parameters, and data structures for ranking the images in a group set. For example, each image data object 520.2 assigned a particular group identifier 520.6 may be ranked against the other image in that group to produce a ranked list 520.7 of the images in the group and/or relative rank values corresponding to their comparative ranks. In some embodiments, ranking engine 554 may include a plurality of hardware and/or software modules configured to use processor 512 and memory 514 to handle or manage defined operations of ranking engine 554. For example, ranking engine 554 may include a group selector 556 configured to determine the image data objects belonging to the group. Ranking engine 554 may include a ranking factor 558 configured to receive, access, and/or determine various metrics and/or metadata that may be relevant to a ranking calculation for a group of images. Ranking engine 554 may include an embedding model 560 configured to calculate custom embeddings for driving ranking engine 554. Ranking engine 554 may include a graph-based algorithm 562 configured to determine relationship ranks among the images in the group. Ranking engine 554 may include a multifactor ranking algorithm 564 configured to use multiple factors to determine composite ranking values and resulting ranked list. Ranking engine 554 may include a user weighting handler 566 configured to use user input to modify the ranking factors and/or rank results. Ranking engine 554 may return rank values for each image for storage by image manager 530 in image metadata 520.3 as separate rank values or to assemble a ranked list of images in a give group. Image manager 530 may then use rank values and/or the ranked list in navigating and displaying images to the user.

Group selector 556 may be configured to select a set of image data objects for a selected group in order to rank the images relative to one another. For example, group selector 556 may use image metadata 520.3 and, more particularly, group identifiers 520.6 to determine the set of image data objects that have a particular group identifier and, therefore, belong to the same group. In some embodiments, the full set of images belonging to the group may be used to ranking. In some embodiments, the full group set of images may be filtered to exclude outlier images that may not meet an image quality (size, resolution, light/color range/average, etc.) threshold, object confidence threshold, group confidence threshold, and/or other criteria for being ranked within the group. Ranking factor handler 558 may be configured to determine one or more ranking factors from image metadata 520.3 and/or calculated therefrom. For example, ranking factor handler 558 may use a unique image identifier (e.g., image name or number) to access image index 520.4 and retrieve metadata values for each image in the set selected by group selector 556, such as system image tags 520.9, group confidence score 520.10, etc. Ranking factors may include static image values, such as system image values (file format, resolution, size, time, location, etc.), image quality metrics (resolution, tilt, contrast, occlusion, etc.), object quality metrics (size, position, occlusion, etc.), image usage values, confidence scores, and user image tags (favorite, object tags, etc.). In some embodiments, ranking factors may include relationship ranking values determine using a graph-based relationship ranking algorithm, as further described below. In some embodiments, ranking factor handler 558 may retrieve embeddings 520.5 for use by ranking engine 554 or ranking engine 554 may include its own embedding model 560 and process the selected set of images to determine feature vectors to be used for ranking.

Embedding model 560 may be used to process objects in the images selected by group selector 556. For example, rather than using embeddings 520.5 generated by object detector 542 and/or calibration engine 570, ranking engine 554 may use a group-specific embedding model for each group to be ranked. Embedding model 560 may be a machine learning-based algorithm for determining feature vectors that is trained based on a set of images specific to the group. For example, the set of images selected by group selector 556 may be used as training image set 560.2. In some embodiments, the group set of images may be further filtered using group filter 560.1 to select a best subset of the group images. For example, group filter 560.1 may use a set of image and object quality filtering criteria similar to those that could be employed by group selector 556, but may include different criteria and thresholds, such as selecting for only full-frontal views with no occlusions. In some embodiments, user input may be used to select, though image manager 530, some or all of training image set 560.2 to assure an adequate number of high-quality images (and target objects) and reduce the noise from low quality images. Embedding model 560 may be trained to generate a set of group parameters 560.3 used for determining new embedding values for the set of images to be ranked. For example, group parameters 560.3 may enable embedding model 560 to more accurately quantify the relevant set of feature vectors for the specific human face or faces being ranked, while potentially rendering the model less effective for facial analysis of the general population or detecting faces from an image where the presence and position of the face is not already known.

Graph-based algorithm 562 may be used to determine relationship rank values among the images in the set of images selected by group selector 556. Graph-based algorithm 562 may be selected from graph-based relationship ranking algorithms, such as a HITS algorithm, PageRank algorithm, or SimRank algorithm, and applying them to the images and/or objects in the images as nodes. In some embodiments, the embeddings may be tokenized to provide link values between similar embeddings in different images/objects. For example, tokenized embeddings 562.1 may quantify similar values for a given feature vector as a link among objects containing those values. Graph-based algorithm 562 may then generate relationship weights 562.2 representing the value of each connection across the set of images. Once graph-based algorithm 562 has iteratively processed all images in the group set, it may determine a relationship rank value for each image. In some embodiments, this relationship rank value may be used as a sole or primary factor for assigning rank values to the images and arranging them in ranked list 520.7.

Multifactor ranking algorithm 564 may be used to determine rank values for images based on a plurality of factors determined by ranking factor handler 558 and/or graph-based algorithm 562. For example, multifactor ranking algorithm 564 may use a weighted sum of relationship rank values, group confidence scores, and static image quality metrics to determine rank values. In some embodiments, multifactor ranking algorithm 564 may include a formula, such as summing, averaging, ratios, or more complex relationships, among ranking factors 564.1, where each ranking factor 564.1 is multiplied by a factor weight within the formula. User weighting handler 566 may be configured to enable and integrate user input into the ranking process. For example, the user may be allowed or prompted to identify favorites among images in image data 520.1 and/or tag specific people or objects in an image. User weighting handler 566 may be configured to use the user input to modify the weightings of one or more factors used in ranking images. For single factor rankings, a user favorite tag may provide a significant enough weighting factor to assure a high or even top-ranking position based on the favorite tag. In multifactor ranking algorithm 564, user input may be provided with its own factor and/or used to modify the weighting values of one or more other factors. In some embodiments, different user tags (e.g., favorite versus descriptive tag) may have different multipliers or other modifiers for changing the factor weights in calculating the rank value and ranked list.

Calibration engine 570 may include an interface protocol and/or set of functions, parameters, and data structures for generating group classifiers 550. For example, calibration engine 570 may determine the possible groups, select the groups qualifying for a group classifier, and train group classifiers 550 for deployment to support image manager 530 and ranking engine 554. In some embodiments, calibration engine 570 may include a plurality of hardware and/or software modules configured to use processor 512 and memory 514 to handle or manage defined operations of calibration engine 570. For example, calibration engine 570 may include a calibration set selector 572 configured to select the set of image data objects 520.2 from non-volatile memory 520 for calibration of group classifiers 550. Calibration engine 570 may include a pre-detection filter 574 configured to reduce the set of image data objects 520.2 prior to object detection. Calibration engine 570 may include an object detector 576 configured to detect objects of a selected object type in each image in the set of image data objects being processed. Calibration engine 570 may include an object filter 578 configured to filter the images with detected objects prior to clustering. Calibration engine 570 may include an image object manager 582 configured to store metadata related to detected objects for use by other functions, such grouping and validation. Calibration engine 570 may include a clustering engine 584 configured to determine an initial set of clusters from the set of image data objects. Calibration engine 570 may include a group selection engine 586 configured to select groups from among the initial groups that are significant enough to receive a dedicated group classifier. Calibration engine 570 may include a group classifier generator 588 configured to generate and train group classifiers 550 based on the selected groups. Calibration engine 570 may include re-clustering logic 590 for determining and initiating recalibration of groups to update group classifiers 550 for changes in the image data and use. In some embodiments, calibration engine 570 returns group classifiers 550 for use by user device 500. Calibration engine 570 may be supported by accessing and storing calibration data 520.12 in non-volatile memory 520.

Calibration set selector 572 may be configured to select the calibration set of image data objects 520.2 from image data 520.1 in non-volatile memory 520. For example, calibration set selector 572 may select all images of defined image file types from non-volatile memory 520. In some embodiments, calibration set selector 572 may use image index 520.4 curated by image manager 530 and/or calibration set selector 572 may perform its own scan of the data in non-volatile memory 520 to identify image data objects. Calibration set selector 572 may implement a pre-detection filter 574 configured to reduce the number of image data objects to be processed. As described above with regard to other filtering/selection operation, a variety of filtering criteria, such as image file type, size, quality, source, storage location, time, etc. may be used to filter the total set of image data objects 520.3 to a calibration data set.

Object detector 576 may operate substantially similar to object detector 542 to detect objects of a desired object type. In some embodiments, object detector 576 may use a different object detection algorithm than object detection algorithm 544. More specifically, because calibration may be done less frequently, timed for available processing resources, and/or offloaded to another system entirely (e.g., a storage server), a heavier weight object detection algorithm with greater processing and memory requirements than those of object detector 542 may be used in some embodiments. Object detector 576 may return detected objects for each image that contains one or more objects of the object type. Similar to object detector 542, object type, object position information, and an object confidence metric may be returned for each detected object in each image and store image objects 520.13 in calibration data 520.12. In some embodiments, object filter 578 may be applied to detected objects prior to processing the detected objects to determine their embeddings. For example, object filter 578 may apply a set of object filter criteria selected from object quality thresholds 578.1 (threshold values for quality metrics, such as size >40 pixels, position not adjacent edge, pitch/roll/yaw <25 degrees, occlusion, etc.) and selection constraints 578.2 (number of objects in the image, largest object in image, etc.). The filtered set of images/objects that pass object filter 578 may be stored as filtered objects 520.14 in calibration data 520.12. In some embodiments, image objects 520.13 and/or filtered objects 520.14 may be stored as cropped objects 520.15 comprised of the image data within the bounding box of the detected object.

Embedding model 580 may operate substantially similar to embedding model 546 in object detector 542. For example, object detector 576 and embedding model 580 may be based on a general population and predetermined standards for quantifying feature vectors. Embedding model 580 may process image objects 520.13, filtered objects 520.14, and/or cropped objects 520.15 to determine embedding values 520.16 for each object in the selected set of images/objects. In some embodiments, calibration engine 570 may include image object manager 582 for storing the metadata from detected objects in a more accessible form, such as within image metadata 520.3 associated with each image. For example, for detected objects 582.1, image object manager 582 may store metadata describing the detected objects in the metadata for the corresponding image. In some embodiments, object positioning information may be stored as object location 582.1.1, the confidence score from object detector 576 may be stored as object confidence score 582.1.2, and the embedding values from embedding model 580 may be stored as embeddings 582.1.2 in an object table, entry, or tag associated with the image metadata for the specific image data object. In some embodiments, the metadata describing the detected object may be appended to the image data object itself and stored with the image data in a storage location 582.2 in non-volatile memory 520.

Clustering engine 584 may be configured to process the set of images with detected objects of the object type determined by object detector 576 (as optionally filtered by object filter 578) in order to identify a plurality of initial groups 520.17. For example, a clustering algorithm 584.1 may be applied to the embeddings of the images containing detected objects and an initial group threshold 582.2 may be applied to a clustering parameter to determine sets of images containing similar sets of embeddings. In some embodiments, an unsupervised clustering method, such as DBSCAN, Chinese whispers, or another graph-based clustering algorithm and corresponding thresholds for identifying and ranking clusters, may be used. Each of the initial groups determined by clustering engine 584 may be treated as a possible group of interest containing the same object (e.g., individual human face) or group of objects (e.g., group of people in the same image). However, initial group clustering may identify clusters that are redundant (e.g., actually contain the same object in different groups), overbroad, and/or outlier subject matter unlikely to be of interest to the user. Generating and running image classifiers for every initial group may waste resources, add to clutter in image manager 530, and diminish the user experience.

Group selection engine 586 may be configured to determine, based on the initial groups 520.17, which groups should be used to generate group classifiers 550. For example, group selection engine 586 may include one or more rule sets for evaluating selection data 520.18, such as metadata related to the initial groups and/or the images and objects they contain, to determine their relevance for ongoing image classification. In some embodiments, for human face objects, face counts 586.1 may be used to determine unique individuals, groups, and unique individuals within groups to eliminate groups that appear inconsistent or redundant. Image metadata 586.2 may be compared against time, location, and other thresholds to eliminate groups that appear limited in their ongoing relevance to the user. A relationship algorithm 586.3, similar to the graph-based relationship ranking algorithms used by ranking engine 554, may be used to evaluate groups and relationships among groups. For example, similarity thresholds 586.4 may be applied to relationship ranks and/or other image metadata to determine that initial groups are too similar and may contain the same object. In some embodiments, user tags 586.5 may be available to assist in identifying groups as containing favorite and/or tagged objects to assist in the selection process. In some embodiments, group selection engine 586 may operate in conjunction with image manager 530 to enable users to assist in tagging and selecting images and corresponding groups for group classifiers 550. Group selection engine 586 may include group selection logic, such as an automated rules engine, for processing initial groups 520.17 and returning a selected subset of groups (e.g., selected groups 520.19) to use for generating group classifiers 550.

Group classifier generator 588 may include functions for automatically generating a plurality of group classifiers 550 corresponding to selected groups 520.19. For example, group classifier generator 588 may receive cluster identifiers and the corresponding set of objects/images in the cluster for selected groups 520.19. Group classifier generator 588 may assign a unique group identifier 588.1 to the group and the group classifier being generated. For example, a unique identification number or group name (such as a name from an identification tag associated with multiple images in the set) may be selected as unique group identifier 588.1. Group classifier generator 588 may select a classifier algorithm 588.2 for the group classifier (or for multiple group classifiers if a multigroup group classifier algorithm is selected). For example, all single group classifiers may be based on the same classifier algorithm 588.2 selected for the object type or a single multigroup group classifier may be based on a multigroup classifier algorithm for the object type.

Group classifier generator 588 may select a training data set 588.3 for the group classifier based on the images associated with the initial cluster by clustering engine 584 and stored as group training data 520.20. For example, training data set 588.3 may be the set of images in the cluster or a filtered subset thereof, using any of the filtering criteria used to filter images and objects elsewhere in calibration engine 570. For multigroup classifier algorithms, one classifier is trained for some or all of the selected groups using one training data set that includes all of the groups (such as a superset of the images corresponding to each group in a clustering analysis). Training of each group classifier may include training classifier algorithm 588.2 using corresponding group training data 520.20 to generate a set of group parameter data 520.21. Group parameter data 520.21 may be associated with group identifier 588.1 (or multiple group identifiers) and classifier algorithm 588.2 to define a portable image classifier that can be deployed for use by image manager 530. In some embodiments, a verification engine 588.4 may be configured to evaluate the quality and reliability of an image group classifier before it is deployed. For example, verification engine 588.4 may receive a set of confidence metrics from the training process and compare them to a deployment threshold 586.5 for determining whether the group classifier is deployed. In some embodiments, a manual verification process may supplement verification engine 588.4 and allow a user to audit the group identifier and images in training data set 588.3 to determine whether they agree with the validity and relevance of the group classifier.

Calibration engine 570 and/or image manager 530 may include re-clustering logic 590 configured to determine whether and when calibration should be initiated to re-evaluate and/or retrain group classifiers 550. For example, re-clustering logic 590 may determine and use a count of images captured or received after deployment of group classifiers 550 that are not classified into one or more groups. A re-clustering threshold may be based on a count threshold (absolute number, percentage of new images, percentage of total images, etc.) that triggers calibration engine 570 to repeat all or some of the calibration process. In some embodiments, a time-based threshold and/or user trigger may be used to trigger recalibration and re-clustering.

Figure 6:
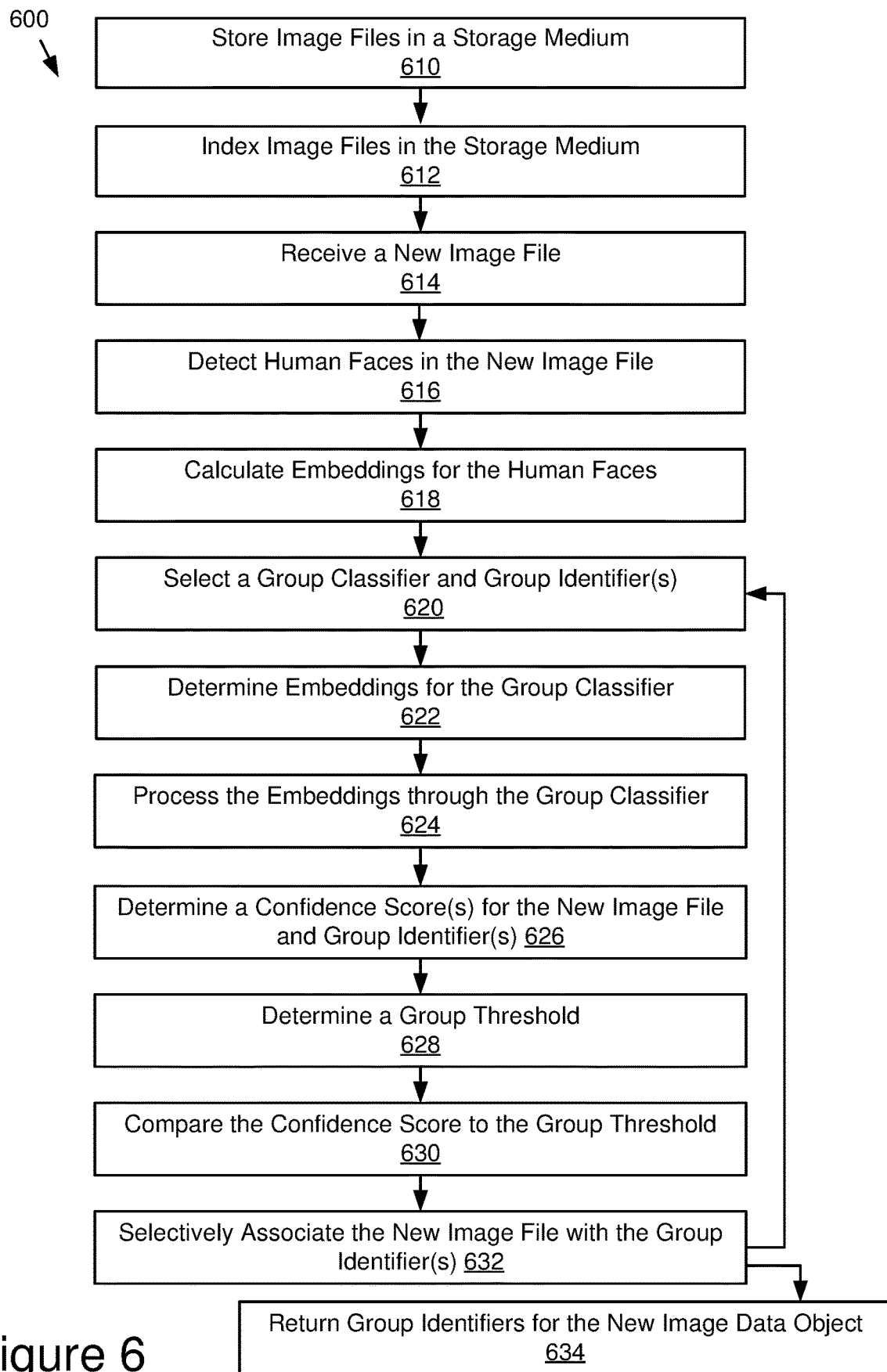
FIG. 6 is a flowchart of an example method of classifying new images in an end user device using group classifiers.

As shown in FIG. 6, user device 500 may be operated according to an example method for classifying new images in an end user device using group classifiers, i.e., according to method 600 illustrated by blocks 610-634 in FIG. 6.

At block 610, image data objects, such as image files, may be stored in a storage medium. For example, an image manager may store image files to the storage medium of a data storage device in the user device as images are captured or received.

At block 612, image files in the storage medium may be indexed. For example, the image manager may generate an image index identifying each image file stored in the storage medium, its storage location, and metadata related to the image file.

At block 614, a new image file may be received. For example, the image manager may receive and image file captured by a camera and related encoding or received through a network interface or other input interface.

At block 616, human faces may be detected in the new image file. For example, an object detector trained for human faces may process the new image data object, determine a human face is present, and return object position information and an object confidence score.

At block 618, embeddings may be calculated for the detected human faces. For example, the image detector may include an embedding model for quantifying feature vectors in each detected human face.

At block 620, a group classifier and corresponding group identifier may be selected. For example, the user device may include one or more group classifiers for determining whether or not the new image data object belongs to one or more groups. A multigroup group classifier may be selected and/or multiple group classifiers may be selected sequentially for each image or detected face. In some embodiments, there may only be one group classifier and it may be selected by default.

At block 622, embeddings may be determined for use by the group classifier. For example, the group classifier may receive the embeddings calculated by the embedding model of the object detector for the image and corresponding detected faces.

At block 624, the embeddings may be processed through the group classifier. For example, the selected group classifier may process the embeddings to determine whether the feature vectors correspond to the identity (e.g., person or group of people) associated with the group.

At block 626, a confidence score may be determined for the new image data object and group classifier. For example, the group classifier may return a group confidence score corresponding to the probability or certainty that the new image data object belongs in the group.

At block 628, a group threshold may be determined. For example, the group classifier may be configured with a corresponding group threshold for determining, based on the confidence score, whether the new image data object should be classified with the corresponding group identifier. Different group thresholds may be configured for different groups. For example, one group may have a confidence threshold of 0.3, another 0.8, and the default may be 0.5 for others.

At block 630, the confidence score may be compared to the group threshold. For example, the group confidence score from block 626 may be compared to the group threshold from block 628 to determine whether the confidence score meets the group threshold for assigning the group identifier to the image data object.

At block 632, the new image file may be selectively associated with the group identifier. For example, if the group threshold is met, then the group identifier may be added to the image metadata for the new image file and, if the group threshold is not met, then the group identifier may not be added. In some examples, a "no group" identifier may be assigned to images that include the object type but not one belonging to a group (such as random bystanders or infrequent subjects). Method 600 may return to block 620 to process the new image file through additional group classifiers, if more than one group classifier is active.

At block 634, group identifiers for the new image data object may be returned. For example, any group identifiers associated with the new image data object at block 632 may be returned to the image manager and/or stored in image metadata for later use in displaying and navigating images on the user device.

Figure 7:
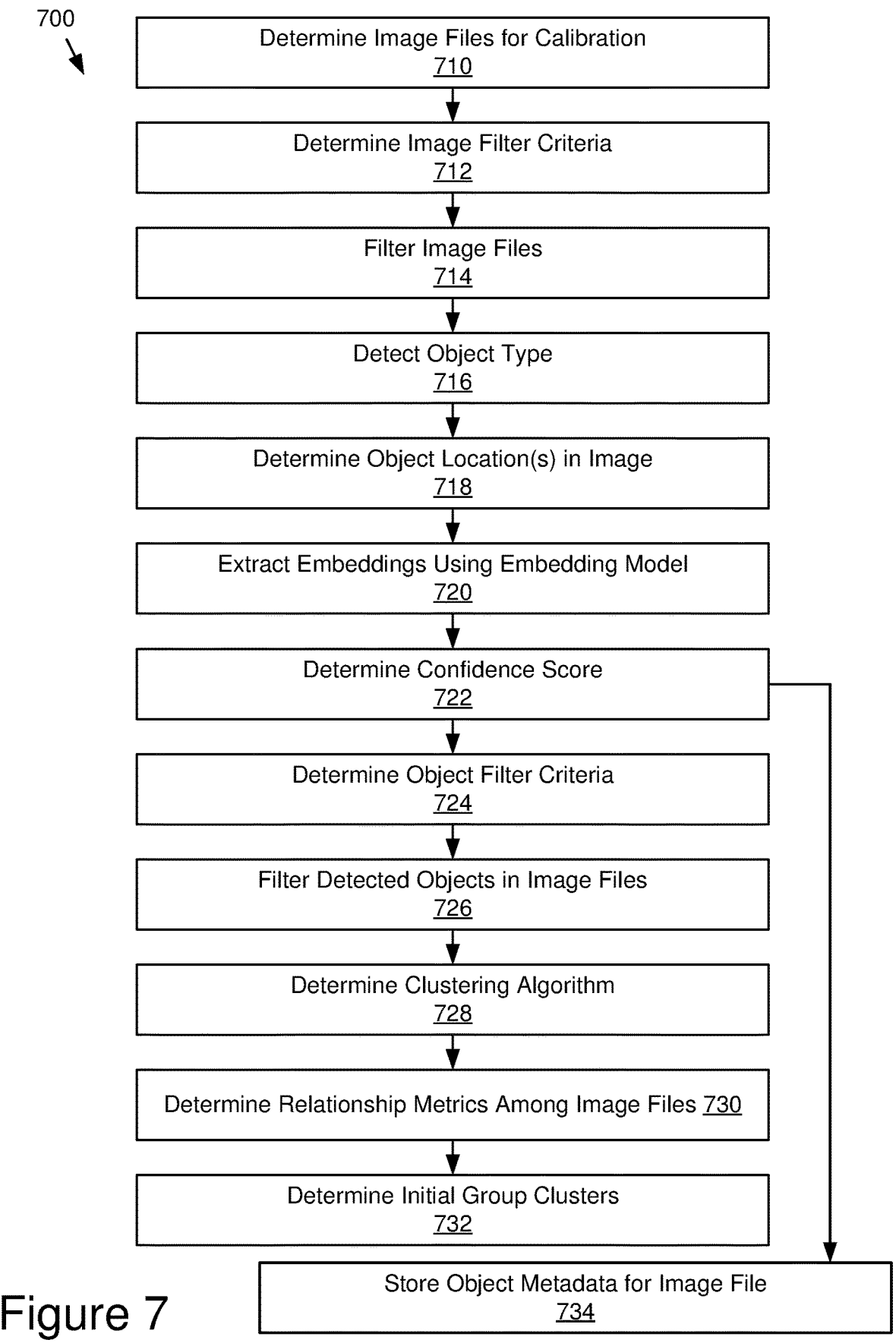
FIG. 7 is a flowchart of an example method of determining initial groups during a first calibration stage.

As shown in FIG. 7, user device 500 may be operated according to an example method for determining initial groups during a first calibration stage, i.e., according to method 700 illustrated by blocks 710-734 in FIG. 7.

At block 710, image files may be determined for calibration. For example, a calibration engine may determine all image files stored on a user device.

At block 712, image filter criteria may be determined. For example, the calibration engine may be configured with a set of criteria for excluding some of the image files from the calibration operation, such as due to low image quality, image source, age, location, etc.

At block 714, image files may be filtered. For example, the calibration engine may apply the image filter criteria from block 712 to the set of image files determined at block 710 to reduce the set of image files to a filtered calibration image set.

At block 716, an object type may be detected. For example, an object detector may process the image files to detect objects of a desired type, such as human face.

At block 718, object locations may be determined in the image data objects. For example, for each detected object, the object detector may return object positioning information, such as a bounding box defining a subset of the frame of the image file, and a confidence score for the likelihood that the object is correctly detected.

At block 720, embeddings may be extracted using an embedding model. For example, the object detector may include a corresponding embedding model that quantifies feature vectors for the detected object. In some configurations, embeddings may not be extracted until after the detected object us further filtered at block 726.

At block 722, a confidence score may be determined for the detected object. For example, the object detector may return an object detection confidence score related to the probability or certainty that an object of the object type was detected.

At block 724, object filter criteria may be determined. For example, the calibration engine may be configured with a set of object filter criteria for determining which objects (and corresponding image files) should be used for clustering analysis, such as comparison to an object detection threshold for inclusion in the clustering analysis.

At block 726, the detected objects in the image files may be filtered. For example, the calibration engine may apply the object filter criteria to the detected objects in each image to reduce the number of objects and images used for clustering, such as detected faces being filtered based on face filter criteria like size, lack of occlusion, face angle, etc.

At block 728, a clustering algorithm may be determined. For example, the calibration engine may be configured with one or more clustering algorithms appropriate to the number and type objects and images to be processed.

At block 730, relationship metrics may be determined among image files. For example, the calibration engine may use the clustering algorithm to analyze relationships among detected objects based on their embedding values and/or other metadata.

At block 732, initial group clusters may be determined. For example, the clustering algorithm may have a corresponding cluster significance metric that determines whether any given group of images should be treated as a related group based on the relationship metrics determined at block 730.

At block 734, object metadata for the image file may be stored. For example, object type, object locations, embeddings, and/or object confidence scores may be stored for later use by the calibration engine, image manager, or other functions.

Figure 8:
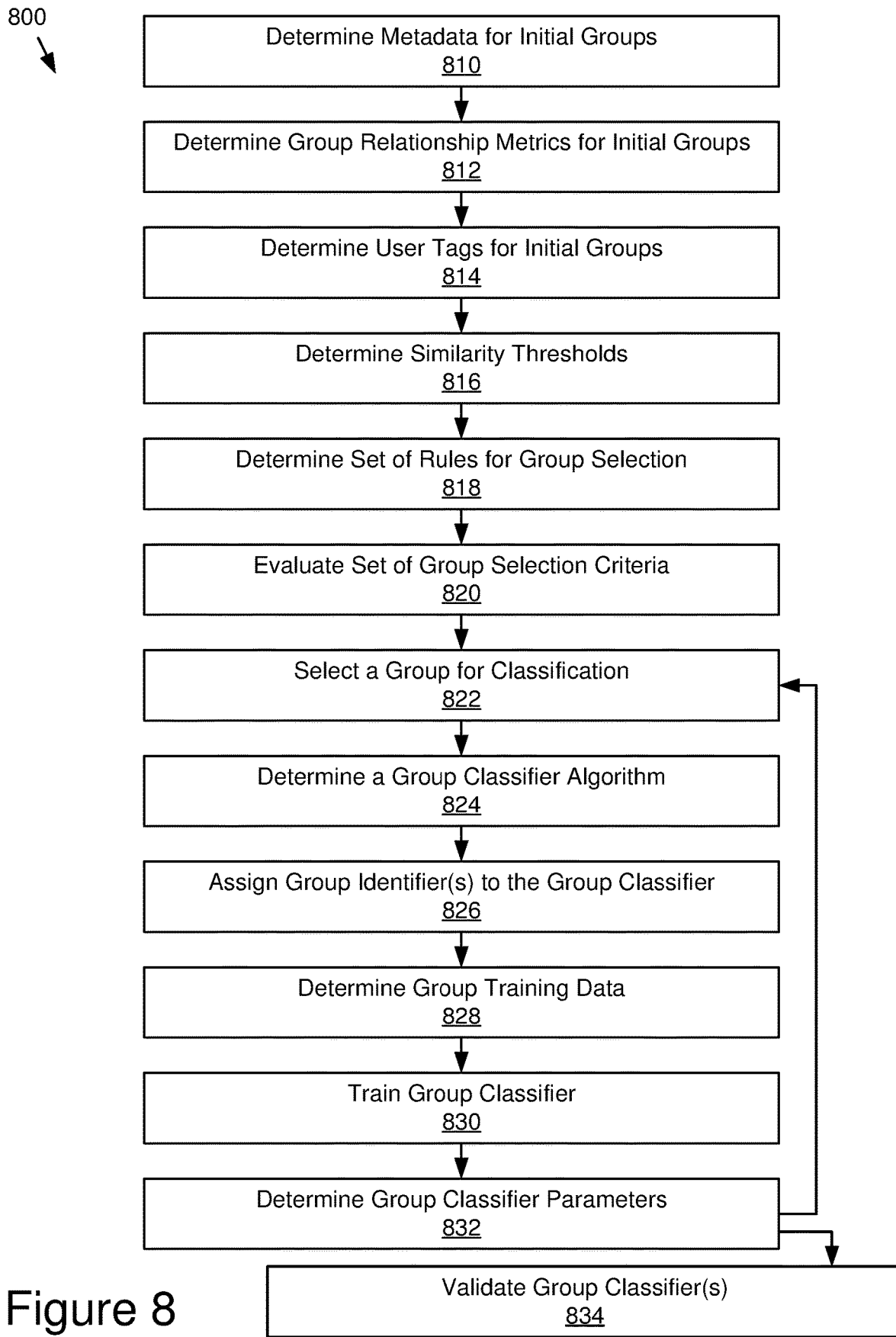
FIG. 8 is a flowchart of an example method of selecting and training group classifiers during a second calibration stage.

As shown in FIG. 8, user device 500 may be operated according to an example method for selecting and training group classifiers during a second calibration stage, i.e., according to method 800 illustrated by blocks 810-834 in FIG. 8.

At block 810, metadata may be determined for initial groups. For example, for each of the initial groups determined by method 700, the calibration engine may determine metadata describing the group by aggregating metadata from the image files in the group.

At block 812, group relationship metrics may be determined for initial groups. For example, for each of the initial groups, the calibration engine may determine relationship metrics, such as the relationship metrics determined by the clustering in method 700 or using a separate graph-based relationship ranking algorithm, within that group and among different groups.

At block 814, user tags may be determined for initial groups. For example, for each of the initial groups, the calibration engine may determine user tags for images in that group based on user tags stored in metadata or soliciting new tags from a user through an image manager.

At block 816, similarity thresholds may be determined. For example, the calibration engine may calculate similarity values based on image metadata and/or group relationship metrics and corresponding threshold values for determining which initial groups are overly similar.

At block 818, a set of rules for group selection may be determined. For example, the calibration engine may include one or more rules corresponding to values determined at blocks 810, 812, 814, and/or 816 and comparing them to one another, corresponding threshold values, and/or combinations thereof.

At block 820, group selection criteria may be evaluated. For example, the calibration engine may evaluate one or more rules from the set of rules determined at block 818 to evaluate each group from the initial groups.

At block 822, a group may be selected for classification. For example, the calibration engine may select a number of groups, based on the criterial evaluated at block 820, as relevant for ongoing image classification.

At block 824, a group classifier algorithm may be determined. For example, the calibration engine may select a machine learning classifier algorithm for this group classifier instance. In some embodiments, a multigroup classifier algorithm may be selected for all or a subset of the selected groups.

At block 826, one or more group identifiers may be assigned to the group classifier. For example, the calibration engine may assign a numeric or other unique identifier for the group classifier and/or a set of group identifiers for a multigroup classifier that will be used to tag images classified as belonging to the group or groups.

At block 828, group training data may be determined. For example, the calibration engine may determine a training data set from the images associated with the initial cluster in method 700.

At block 830, the group classifier may be trained. For example, the calibration engine may train the group classifier algorithm using the group training data.

At block 832, group classifier parameters may be determined. For example, the output of training the group classifier at block 830 may be a set of machine learning parameter values, such as weight values, corresponding to the group-specific decision-making criteria of the trained group classifier. Method 800 may return to block 822 to select another group for generating the corresponding group classifier.

At block 834, group classifiers may be validated. For example, the calibration engine may include a set of validation or deployment criteria or thresholds that must be met to deploy each image classifier for use by the image manager.

Figure 9:
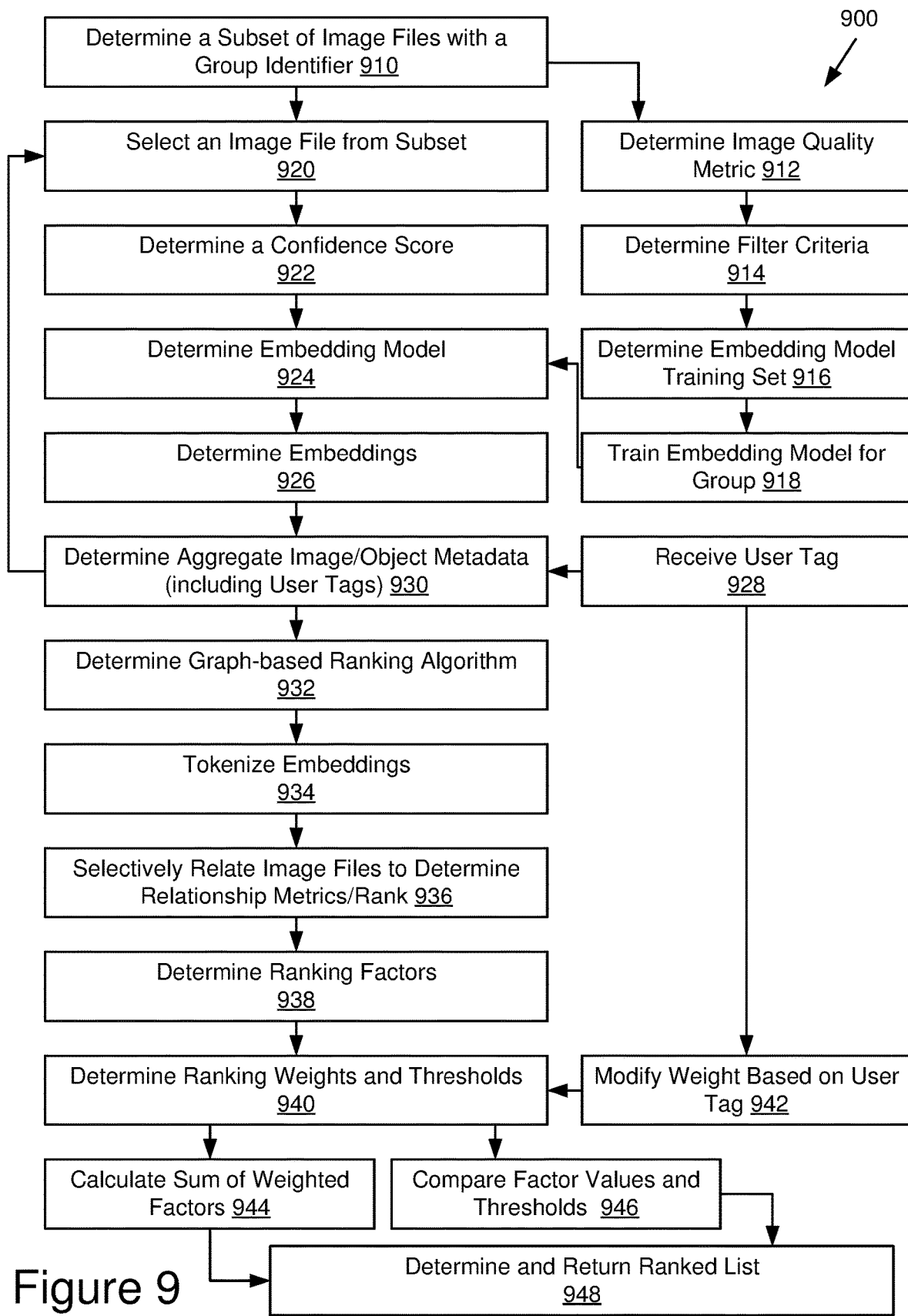
FIG. 9 is a flowchart of an example method of ranking images in a group in response to classification by group classifiers.

As shown in FIG. 9, user device 500 may be operated according to an example method for ranking images in a group in response to classification by group classifiers, i.e., according to method 900 illustrated by blocks 910-948 in FIG. 9.

At block 910, a subset of image files corresponding with a group identifier may be determined. For example, each image file may have associated group identifier tags stored in image metadata and a ranking engine may determine a set of image files having the same group identifier tag.

At block 912, image quality metrics may be determined. For example, image metadata may include image quality metrics, such as size and resolution, and/or image quality metrics may be calculated from the image files or their metadata.

At block 914, object filter criteria may be determined. For example, the ranking engine may be configured with object filter criteria applied to the image quality metrics and/or other image metadata to select the most representative or highest quality images with regard to the desired object.

At block 916, an embedding model training set may be determined. For example, the ranking engine may use the object filter criteria to select an embedding model training set based on images with the group identifier meeting an image quality threshold.

At block 918, the embedding model for the group may be trained. For example, a machine learning embedding model algorithm may be trained using the embedding model training set to generate embedding model parameters specific to determining feature vectors for the group.

At block 920, an image file may be selected from the subset. For example, the ranking engine may select an image file from the set determined at block 910.

At block 922, a confidence score may be determined for the image file. For example, the ranking engine may retrieve the group confidence score determined by the group classifier in method 600 and stored in image metadata.

At block 924, an embedding model may be determined. For example, the ranking engine may use the embedding model parameters determined from training at block 916 to have an embedding model specific to the group.

At block 926, embeddings may be determined for the objects in the image file. For example, the ranking engine may apply the embedding model from block 924 to the objects in the image file.

At block 928, a user tag for the image file may be received. For example, the ranking engine may solicit a user tag and/or may identify a user tag among the image metadata for the image file.

At block 930, aggregate image and object metadata may be determined. For example, the ranking engine may aggregate the image metadata, including the metadata describing the detected objects within the image, to provide a pool of data about the image files in the group for performing ranking analysis.

At block 932, a graph-based ranking algorithm may be determined. For example, the ranking engine may be configured with a graph-based ranking algorithm.

At block 934, embeddings from the image file may be tokenized. For example, the ranking engine may tokenize each feature vector according to value ranges that describe similar feature vectors for finding similarity among detected objects.

At block 936, image file may be selectively related to other image files to determine relationship metrics and/or ranks. For example, the ranking engine may use the graph-based ranking algorithm to process the objects in the image files as nodes with the tokenized embeddings as links among the image files to rank the relationship values among the image files, for use as a rank value or a factor in further calculation of rank values.

At block 938, ranking factors may be determined. For example, the ranking engine may be configured with one or more ranking algorithms having corresponding ranking factors.

At block 940, ranking weights and thresholds may be determined. For example, the ranking factors determined at block 938 may be related through a ranking algorithm that includes factor weights and thresholds for calculating rank values.

At block 942, one or more factor weights may be modified based on a user tag. For example, based on a user tag identifying a particular image or object, the ranking engine may increase one or more weights to reflect the user input.

At block 944, a sum of weighted factors may be determined. For example, the ranking engine may calculate the rank value for each image based on the sum of weighted factors corresponding to that image.

At block 946, factor values may be directly compared to each other and/or corresponding threshold values. For example, the ranking engine may select a single factor, place range constraints (upper and/or lower thresholds) and use the factor value for each image within the range as the rank value.

At block 948, a ranked list may be determined and returned. For example, the ranking engine may return rank values for each image in the group to be stored and used by the image manager and the image manager may use the rank values to provide a ranked list through the graphical user interfaced—allowing the user to view, select, and/or navigate the images based on the rank order provided in the ranked list.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
   at least one processor;
   at least one memory;
   a storage medium configured to store user image data;
   an image manager, stored in the at least one memory for execution by the at least one processor, configured to index image data objects in the user image data;
   at least one image group classifier, stored in the at least one memory for execution by the at least one processor, configured to:
   determine a first set of embeddings quantifying a plurality of features in a set of image data objects, wherein the first set of embeddings includes a plurality of feature vectors for at least one human face;
   process the first set of embeddings for each image data object in the set of image data objects through a set of machine learning parameters assigned to a first group identifier, wherein the set of machine learning parameters is based on training a first image group classifier using a first training set of embeddings for a plurality of image data objects corresponding to the first group identifier; and
   determine a subset of image data objects in the set of image data objects corresponding to the first group identifier; and
   at least one ranking engine, stored in the at least one memory for execution by the at least one processor, configured to:
   process the subset of image data objects to train an embedding model corresponding to the first group identifier;
   process, using the embedding model corresponding to the first group identifier, the subset of image data objects to determine, for each image data object in the subset of image data objects, a second set of embeddings;
   process, using a ranking algorithm based on relationships among the second sets of embeddings, the second set of embeddings for each image data object in the subset of image data objects; and
   return, based on the ranking algorithm, a ranked list of the subset of image data objects, wherein the image manager is further configured to display, based on the ranked list, at least one image data object from the subset of image data objects on a graphical user interface.

2. The system of claim 1, further comprising:
a face detector, stored in the at least one memory for execution by the at least one processor, configured to:
detect, in the set of image data objects, at least one human face; and
calculate, for the at least one human face, the first set of embeddings quantifying the plurality of features of the at least one human face using a first embedding model corresponding to the plurality of feature vectors for the at least one human face.

3. The system of claim 2, wherein:
the at least one human face includes a plurality of human faces in the set of image data object;
the first set of embeddings quantifies the plurality of features for each human face of the plurality of human faces; and
the first group identifier corresponds to a social group corresponding to a plurality of people.

4. The system of claim 2, wherein:
each image data object in the subset of image data objects includes the at least one human face corresponding to the first group identifier; and
the at least one ranking engine is further configured to calculate, for the at least one human face in each image data object in the subset of image data objects, the second set of embeddings quantifying the plurality of features of the at least one human face using the embedding model corresponding to the first group identifier.

5. The system of claim 2, wherein:
the at least one image group classifier is further configured to:
determine, for each image data object in the set of image data objects, a confidence score based on the set of machine learning parameters and the first set of embeddings for that image data object; and
compare the confidence score to a group confidence threshold to determine the subset of image data objects in the set of image data objects corresponding to the first group identifier; and
the at least one ranking engine is further configured to use the confidence score for each image data object in the subset of image data objects corresponding to the first group identifier.

6. The system of claim 2, wherein the at least one ranking engine is further configured to use a graph-based ranking algorithm to process the second set of embeddings to determine the ranked list of the subset of image data objects.

7. The system of claim 6, wherein the graph-based ranking algorithm is selected from:
a PageRank algorithm;
a hyperlink-induced topic search algorithm; and
a SimRank algorithm.

8. The system of claim 6, wherein the graph-based ranking algorithm is configured to:
tokenize each embedding of the second set of embeddings for each image data object in the subset of image data objects; and
selectively relate, based on at least one weight value, the tokenized embeddings for a first image data object to corresponding tokenized embeddings for each other image data object in the subset of image data objects to determine the ranked list of the subset of image data objects.

9. The system of claim 8, wherein the at least one ranking engine is further configured to:
receive at least one user tag for at least one image data object in the subset of image data objects; and
modify at least one weight value corresponding to the at least one image data object associated with the at least one user tag.

10. The system of claim 2, wherein the at least one ranking engine is further configured to:
for each image data object in the subset of image data objects:
determine, based on the first set of embeddings, at least one image quality metric;
determine, based on the set of machine learning parameters and the first set of embeddings for that image data object, at least one confidence score; and
determine, based on a graph-based ranking algorithm, at least one relationship rank value; and
determine the ranked list of the subset of image data objects based on, for each image data object in the subset of image data objects:
the at least one image quality metric;
the at least one confidence score; and
the at least one relationship rank value.

11. A computer-implemented method, comprising:
determining an index of image data objects in user image data stored in a storage medium;
determining, by at least one image group classifier, a first set of embeddings quantifying a plurality of features in a set of image data objects, wherein the first set of embeddings includes a plurality of feature vectors for at least one human face;
processing, by the at least one image group classifier, the first set of embeddings for each image data object in the set of image data objects through a set of machine learning parameters assigned to a first group identifier, wherein the set of machine learning parameters are based on training a first image group classifier using a first training set of embeddings for a plurality of image data objects corresponding to the first group identifier;
determining, by the at least one image group classifier, a subset of image data objects in the set of image data objects corresponding to the first group identifier;
processing the subset of image data objects to train an embedding model corresponding to the first group identifier;
processing, using the embedding model corresponding to the first group identifier, the subset of image data objects to determine, for each image data object in the subset of image data objects, a second set of embeddings;
processing, using a ranking algorithm based on relationships among the second sets of embeddings, the second set of embeddings for each image data object in the subset of image data objects to determine a ranked list of the subset of image data objects; and
displaying, based on the ranked list, at least one image data object on a graphical user interface.

12. The computer-implemented method of claim 11, further comprising:
detecting, in the set of image data objects, at least one human face; and
calculating, for the at least one human face, the first set of embeddings quantifying the plurality of features of the at least one human face using a first embedding model corresponding to the plurality of feature vectors for the at least one human face, wherein each image data object in the subset of image data objects includes the at least one human face corresponding to the first group identifier.

13. The computer-implemented method of claim 12, wherein:
the at least one human face includes a plurality of human faces in the set of image data object;
the first set of embeddings quantifies the plurality of features for each human face of the plurality of human faces; and
the first group identifier corresponds to a social group corresponding to a plurality of people.

14. The computer-implemented method of claim 12, further comprising:
calculating, for the at least one human face in each image data object in the subset of image data objects, the second set of embeddings quantifying the plurality of features of the at least one human face using the embedding model corresponding to the first group identifier that is different than the first embedding model.

15. The computer-implemented method of claim 12, further comprising:
determining, for each image data object in the set of image data objects, a confidence score based on the set of machine learning parameters and the first set of embeddings for that image data object;
comparing the confidence score to a group confidence threshold to determine the subset of image data objects in the set of image data objects corresponding to the first group identifier; and
using the confidence score for each image data object in the subset of image data objects to determine the ranked list of the subset of image data objects.

16. The computer-implemented method of claim 12, further comprising:
using a graph-based ranking algorithm to process the second set of embeddings to determine the ranked list of the subset of image data objects.

17. The computer-implemented method of claim 16, further comprising:
tokenizing each embedding of the second set of embeddings for each image data object in the subset of image data objects; and
selectively relating, based on at least one weight value of the graph-based ranking algorithm, tokenized embeddings from a first image data object to corresponding tokenized embeddings for each other image data object in the subset of image data objects to determine the ranked list of the subset of image data objects.

18. The computer-implemented method of claim 17, further comprising:
receiving at least one user tag for at least one image data object in the subset of image data objects; and
modifying at least one weight value corresponding to the at least one image data object associated with the at least one user tag.

19. The computer-implemented method of claim 18, further comprising:
for each image data object in the subset of image data objects:
determining, based on the first set of embeddings, at least one image quality metric;
determining, based on the set of machine learning parameters and the first set of embeddings for that image data object, at least one confidence score; and
determining, based on a graph-based ranking algorithm, at least one relationship rank value; and
determining the ranked list of the subset of image data objects based on, for each image data object in the subset of image data objects:
the at least one image quality metric;
the at least one confidence score; and
the at least one relationship rank value.

20. An end-user computing device, comprising:
at least one processor;
at least one memory;
a camera configured to capture user image data;
a storage medium configured to store user image data;
means for determining an index of image data objects in user image data stored in the storage medium;
means for determining, by at least one image group classifier, a first set of embeddings quantifying a plurality of features in a set of image data objects, wherein the first set of embeddings includes a plurality of feature vectors for at least one human face;
means for processing, by the at least one image group classifier, the first set of embeddings for each image data object in the set of image data objects through a set of machine learning parameters assigned to a first group identifier, wherein the set of machine learning parameters is based on training a first image group classifier using a first training set of embeddings for a plurality of image data objects corresponding to the first group identifier;
means for determining, by the at least one image group classifier, a subset of image data objects in the set of image data objects corresponding to the first group identifier;
means for processing the subset of image data objects to train an embedding model corresponding to the first group identifier;
means for processing, using the embedding model corresponding to the first group identifier, the subset of image data objects to determine, for each image data object in the subset of image data objects, a second set of embeddings;
means for processing, using a ranking algorithm based on relationships among the second sets of embeddings, the second set of embeddings for each image data object in the subset of image data objects to determine a ranked list of the subset of image data objects; and
means for displaying, based on the ranked list, at least one image data object on a graphical user interface.

* * * * *